(12) United States Patent
Hyde et al.

(10) Patent No.: US 9,767,933 B2
(45) Date of Patent: Sep. 19, 2017

(54) LIQUID FUEL NUCLEAR FISSION REACTOR

(75) Inventors: Roderick A. Hyde, Redmond, WA (US); Jon D. McWhirter, Newcastle, WA (US)

(73) Assignee: TerraPower, LLC, Bellevue, WA (US)

( * ) Notice: Subject to any disclaimer, the term of this patent is extended or adjusted under 35 U.S.C. 154(b) by 1161 days.

(21) Appl. No.: 12/804,091

(22) Filed: Jul. 12, 2010

(65) Prior Publication Data

US 2011/0293060 A1 Dec. 1, 2011

Related U.S. Application Data

(63) Continuation-in-part of application No. 12/800,400, filed on May 25, 2010, now Pat. No. 9,183,953.

(51) Int. Cl.

| | |
|---|---|
| G21C 19/28 | (2006.01) |
| G21C 1/02 | (2006.01) |
| G21C 3/44 | (2006.01) |
| G21C 3/22 | (2006.01) |
| G21C 1/32 | (2006.01) |
| G21C 3/24 | (2006.01) |
| G21C 21/02 | (2006.01) |
| G21C 5/00 | (2006.01) |

(52) U.S. Cl.
CPC ............... *G21C 19/28* (2013.01); *G21C 1/02* (2013.01); *G21C 1/024* (2013.01); *G21C 1/026* (2013.01); *G21C 1/32* (2013.01); *G21C 3/22* (2013.01); *G21C 3/24* (2013.01); *G21C 3/44* (2013.01); *G21C 21/02* (2013.01); *G21C 5/00* (2013.01); *Y02E 30/34* (2013.01)

(58) Field of Classification Search
CPC .......... G21C 1/024; G21C 1/026; G21C 3/44; G21C 3/22
USPC ................ 376/171, 359, 172, 173, 180, 181
See application file for complete search history.

(56) References Cited

U.S. PATENT DOCUMENTS

| | | | | |
|---|---|---|---|---|
| 2,853,446 | A * | 9/1958 | Balent et al. ................. | 376/428 |
| 2,961,390 | A * | 11/1960 | Davidson et al. ............ | 252/640 |
| 3,041,263 | A * | 6/1962 | King et al. .................... | 376/177 |
| 3,200,042 | A | 8/1965 | Schludi | |
| 3,205,138 | A * | 9/1965 | Barr ........................ | G21C 5/14 376/171 |
| 3,280,011 | A | 10/1966 | O'Connor et al. | |
| 3,293,135 | A | 12/1966 | Jaye et al. | |
| 3,350,272 | A * | 10/1967 | Seltorp .................... | G21C 1/07 376/265 |

(Continued)

FOREIGN PATENT DOCUMENTS

| | | |
|---|---|---|
| DE | 2832552 A1 | 2/1980 |
| GB | 1422789 A | 1/1976 |
| WO | 98/59347 A1 | 12/1998 |

OTHER PUBLICATIONS

"Diffusion." Merriam-Webster.com. Merriam-Webster, n.d. Web. Nov. 14, 2013. <http://www.merriam-webster.com/dictionary/diffusion>.*

(Continued)

*Primary Examiner* — Jack W Keith
*Assistant Examiner* — Sharon M Davis

(57) ABSTRACT

Disclosed embodiments include nuclear fission reactors, nuclear fission fuel pins, methods of operating a nuclear fission reactor, methods of fueling a nuclear fission reactor, and methods of fabricating a nuclear fission fuel pin.

9 Claims, 45 Drawing Sheets

(56) References Cited

U.S. PATENT DOCUMENTS

| | | | |
|---|---|---|---|
| 4,257,847 A | 3/1981 | Gibby et al. | |
| 4,327,443 A | 4/1982 | Cotton | |
| 4,563,327 A | 1/1986 | Minkov | |
| H689 H | 10/1989 | Christiansen et al. | |
| 5,377,246 A | 12/1994 | Taylor, Jr. et al. | |
| 5,774,514 A | 6/1998 | Rubbia | |
| 6,033,636 A | 3/2000 | Todokoro et al. | |
| 2002/0136346 A1* | 9/2002 | Aujollet | G21C 3/042 376/383 |
| 2005/0082469 A1 | 4/2005 | Carlo | |
| 2008/0144762 A1* | 6/2008 | Holden | C22C 16/00 376/416 |
| 2009/0279658 A1 | 11/2009 | Leblanc | |

OTHER PUBLICATIONS

PCT International Search Report; International App. No. PCT/US2011/000941; Nov. 9, 2011; pp. 1-2.

PCT International Search Report; International App. No. PCT/US2011/000943; Nov. 9, 2011; pp. 1-3.

Ackerman, J. P., Chow, L. S. H., McDeavitt, S. M., Pereira, C., and Woodman, R. H., "Isolating Wastes in the Electrometallurgical Treatment of Spent Nuclear Fuel", *Journal of Metals (JOM)*, Jul. 1997, pp. 26-28, vol. 49, No. 7, The Minerals, Metals & Materials Society (TMS).

Cammi, A.; Di Marcello, V.; and Luzzi, L.; "Modelling of Circulating Nuclear Fuels with Comsol Multiphysics"; Proceedings of the COMSOL Users Conference; 2007; pp. 1-7; Grenoble, France.

Lane, James A.; MacPherson, H. G.; Maslan, Frank; "Liquid Metal Fuel Reactors", "Reactor Physics for Liquid Metal Reactor Design", and "Composition and Properties of Liquid-Metal Fuels"; *Fluid Fuel Reactors*; 1958; pp. 703-742; Addison-Wesley Publishing Company, Inc.; Reading, Massachusetts, USA.

Christiansen et al.; "Fuel Pin"; United States Statutory Invention Registration No. H689; Oct. 3, 1989; pp. 1-9.

PCT International Search Report; International App. No. PCT/US2011/000942; Nov. 29, 2011; pp. 1-2.

DeWitte, Jacob D., "Reactor Protection System Design Alternatives for Sodium Fast Reactors", Department of Nuclear Science and Engineering, Massachusetts Institute of Technology, Jan. 28, 2011.

European Supplementary Search Report for European Patent Application No. 11787027.9 dated Nov. 3, 2016.

European Supplementary Search Report for European Patent Application No. 11787029.5 dated Nov. 3, 2016.

European Supplementary Search Report for European Patent Application No. 11787028.7 dated Nov. 3, 2016.

* cited by examiner

812

818 — Dispose, homogeneously in the reactor vessel, fertile nuclear fission fuel material in contact with a solution of the fissile nuclear fission fuel material dissolved in the neutronically translucent liquid carrier material, the fertile nuclear fission fuel material remaining undissolved in the solution

820 — Dispose, heterogeneously in the reactor vessel, fertile nuclear fission fuel material in contact with a solution of the fissile nuclear fission fuel material dissolved in the neutronically translucent liquid carrier material, the fertile nuclear fission fuel material remaining undissolved in the solution

FIG.8G

LIQUID FUEL NUCLEAR FISSION REACTOR

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of United States Patent Application No. 12/800,400, entitled LIQUID FUEL NUCLEAR FISSION REACTOR, naming Roderick A. Hyde and Jon D. McWhirter as inventors, filed May 25, 2010 now U.S. Pat. No. 9,183,953, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

This patent application relates to nuclear fission reactors.

SUMMARY

Disclosed embodiments include nuclear fission reactors, nuclear fission fuel pins, methods of operating a nuclear fission reactor, methods of fueling a nuclear fission reactor, and methods of fabricating a nuclear fission fuel pin.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIGS. 8B-8H are flowcharts of illustrative details of the method of FIG. 8A.

DETAILED DESCRIPTION

Figure 1A:
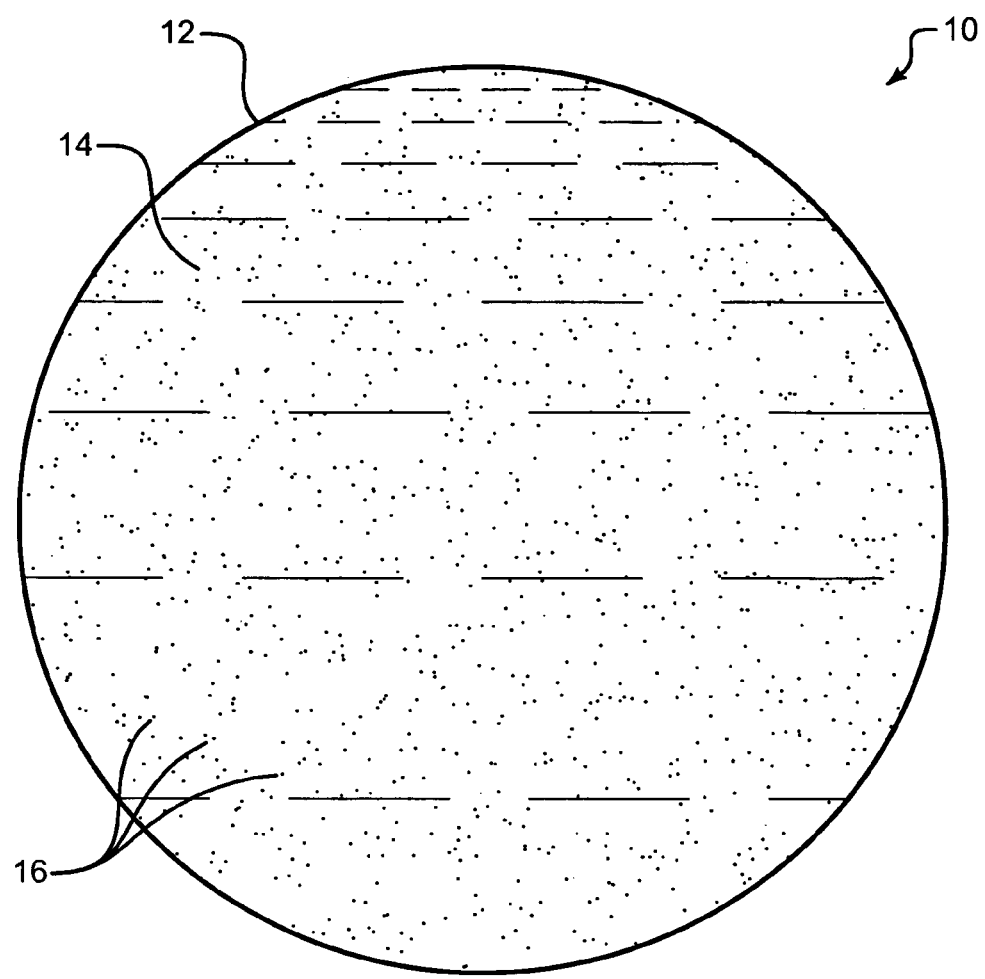
FIGS. 1A-1C are top plan views in partial schematic form of illustrative nuclear fission reactors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application uses formal outline headings for clarity of presentation. However, it is to be understood that the outline headings are for presentation purposes, and that different types of subject matter may be discussed throughout the application (e.g., devices/structures may be described under processes/operations headings and/or processes/operations may be discussed under structures/processes headings; and/or descriptions of single topics may span two or more topic headings). Hence, the use of the formal outline headings is not intended to be in any way limiting.

Illustrative Nuclear Fission Reactors

Given by way of overview and referring to FIG. 1A, in a non-limiting embodiment an illustrative nuclear fission reactor 10 includes a reactor vessel 12. A solution 14 of fissile nuclear fission fuel material dissolved in neutronically translucent liquid carrier material is received in the reactor vessel 12. Undissolved fertile nuclear fission fuel material 16 is disposed in contact with the solution 14. The fertile nuclear fission fuel material 16 is transmutable into the fissile nuclear fission fuel material.

Still by way of overview, in operation a portion of the undissolved fertile nuclear fission fuel material 16 is transmuted into the fissile nuclear fission fuel material. The transmuted fissile nuclear fission fuel material is diffused to the solution 14.

Thus, in some embodiments diffusion of transmuted fissile nuclear fission fuel material to the solution 14 could help replenish a portion of the fissile nuclear fission fuel material that is consumed during fissioning of the fissile nuclear fission fuel material.

Non-limiting, illustrative details will be set forth below by way of example and not of limitation.

Still referring to FIG. 1A, solubility of the fissile nuclear fission fuel material in the neutronically translucent liquid carrier material is greater than solubility of the fertile nuclear fission fuel material 16 in the neutronically translucent liquid carrier material. In some embodiments and as mentioned above, the fissile nuclear fission fuel material is solvable in the neutronically translucent liquid carrier material, thereby making the solution 14. In some embodiments, the fertile nuclear fission fuel material 16 is substantially insoluble in the neutronically translucent liquid carrier material.

The liquid carrier material, the fissile nuclear fission fuel material, and the fertile nuclear fission fuel material 16 may be selected among as desired according to the above solubility and neutronic translucency relationships.

For example, in various embodiments the neutronically translucent liquid carrier material may include liquid materials such as Mg, Ag, Ca, Ni, and the like. In some embodiments the fissile nuclear fission fuel material may include $^{239}$Pu. Also, in some embodiments the fertile nuclear fission fuel material 16 may include $^{238}$U.

An example will be explained by way of illustration and not of limitation. In one illustrative embodiment, the liquid carrier material may include liquid Mg, the fissile nuclear fission fuel material may include $^{239}$Pu, and the fertile nuclear fission fuel material 16 may include $^{238}$U. In such an illustrative case, Mg has a melting point around 650° C. The liquid Mg carrier material is a solvent for the $^{239}$Pu fissile nuclear fission fuel material, and the plutonium lowers the melting point of the magnesium. Given by way of non-limiting example, at around 5 atom percent Pu, a eutectic composition is formed with a melting temperature of around 600° C. The liquid Mg carrier material is not a solvent for the $^{238}$U fertile nuclear fission fuel material 16 (and is substantially immiscible in solid and liquid form). Also, Mg has a neutron absorption cross section in the fast spectrum on the order of around 1 mb. Such a low neutron cross section in the fast spectrum thus makes the liquid Mg carrier material neutronically translucent to the $^{239}$Pu fissile nuclear fission fuel material.

It will be appreciated that mass transfer diffusion coefficients affect diffusion of the transmuted fissile nuclear fission fuel material. For the non-limiting combination of materials discussed above, the mass transfer diffusion coefficient for Pu through liquid Mg is approximately 1 E-05 cm$^2$/s. As will be discussed further below, the transmuted fissile nuclear fission fuel material first diffuses through the fertile nuclear fission fuel material 16 to get to the solution 14. With that in mind, the mass transfer diffusion coefficient for Pu through U is approximately 1E-12 cm$^2$/s.

As mentioned above, the undissolved fertile nuclear fission fuel material 16 is disposed in contact with the solution 14. In some embodiments, the fertile nuclear fission fuel material 16 may be in direct physical contact with the neutronically translucent liquid carrier material. Moreover, in some embodiments the fertile nuclear fission fuel material 16 may be suspended in the neutronically translucent liquid carrier material.

To that end, in some embodiments the fertile nuclear fission fuel material 16 may be provided in solid form. In various embodiments, the fertile nuclear fission fuel material may be provided in various forms such as granular form, wire form, plate form, foam form, and the like.

Regardless of form in which the fertile nuclear fission fuel material is provided and as mentioned above, the transmuted fissile nuclear fission fuel material first diffuses through the fertile nuclear fission fuel material 16 to get to the solution 14. It will be appreciated that the larger the specific surface area provided by the form of the fertile nuclear fission fuel material, the greater the rate of diffusion of transmuted fissile nuclear fission fuel material through the fertile nuclear fission fuel material to the liquid carrier material. It will also be appreciated that, when the fertile nuclear fission fuel material is provided in granular form, a small particle size can help introduce a large concentration gradient (of transmuted fissile nuclear fission fuel material) without large differences in concentration (between transmuted fissile nuclear fission fuel material distributed in the fertile nuclear fission fuel material and fissile nuclear fission fuel material dissolved in the neutronically translucent liquid carrier material). Thus, a concentration of the fissile nuclear fission fuel material in the fertile nuclear fission fuel material 16 is established that is greater than a concentration of the fissile nuclear fission fuel material in the neutronically translucent liquid carrier material. It is this concentration gradient that causes the transmuted fissile nuclear fission fuel material to diffuse through the fertile nuclear fission fuel material 16 to the solution 14.

Still referring to FIG. 1A, the solution 14 and the fertile nuclear fission fuel material 16 may be distributed in the reactor vessel 12 in any manner as desired. To that end, no limitation is implied, and is not to be inferred, from the illustration shown in FIG. 1A.

Figure 1B:
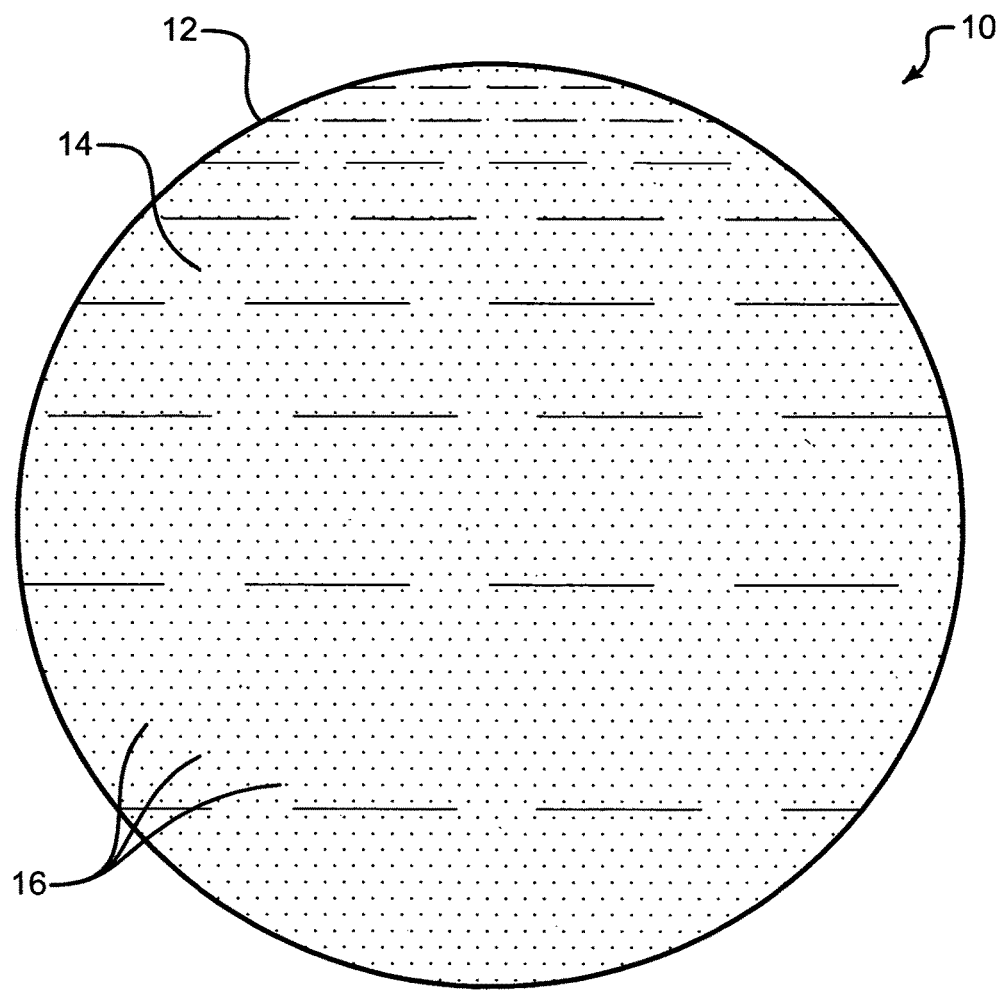

Referring now to FIG. 1B, in some embodiments the solution 14 and the fertile nuclear fission fuel material 16 may be distributed homogeneously in the reactor vessel 12. For example, the fertile nuclear fission fuel material 16 may be provided in any format that may lend itself to homogeneous distribution within the solution 14, such as without limitation any one or more format like pellets, rods, particle suspension, foam, and the like.

Given by way of nonlimiting example of a homogeneous distribution, for depleted U in the 60 v/o range, 8-9 v/o of Pu in Mg is entailed in order to attain a potentially critical configuration (that is, $k_\infty>1$). Too much depleted U by volume results in $k_\infty<1$, which is not useable as a fuel (that is, it does not become self-sustaining). At about 9 v/o Pu in Mg (around 50 w/o Pu), liquid Pu comes out of solution from the Mg and forms a two liquid system, so this is another constraint on the level of Pu from the high end.

The effect of the depleted U on $k_\infty$ can be reduced in any one or more of several ways, such as by: (i) suspending the U at a reduced concentration in the Pu—Mg solution, thereby resulting in a higher $k_\infty$; or (ii) diluting the U with a solid, insoluble, neutronically translucent material such as MgO; or (iii) providing the U in a foam form with much higher porosity and hence lower concentration, thereby resulting in a higher $k_\infty$.

In any of these cases, if the U content is reduced to below about 50 v/o, then a lower Pu concentration, such as on the order of around 3-5 v/o, can result in $k_\infty>1$.

Figure 1C:
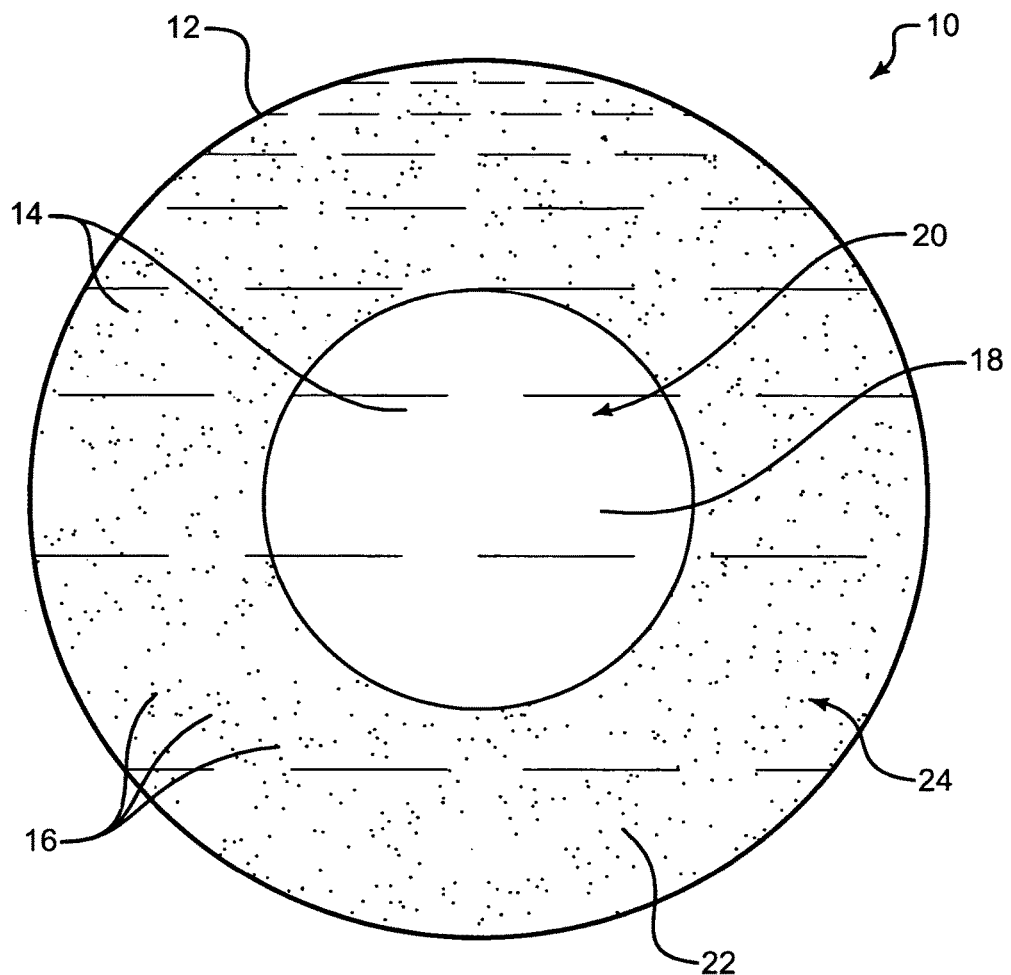
Figure 1D:
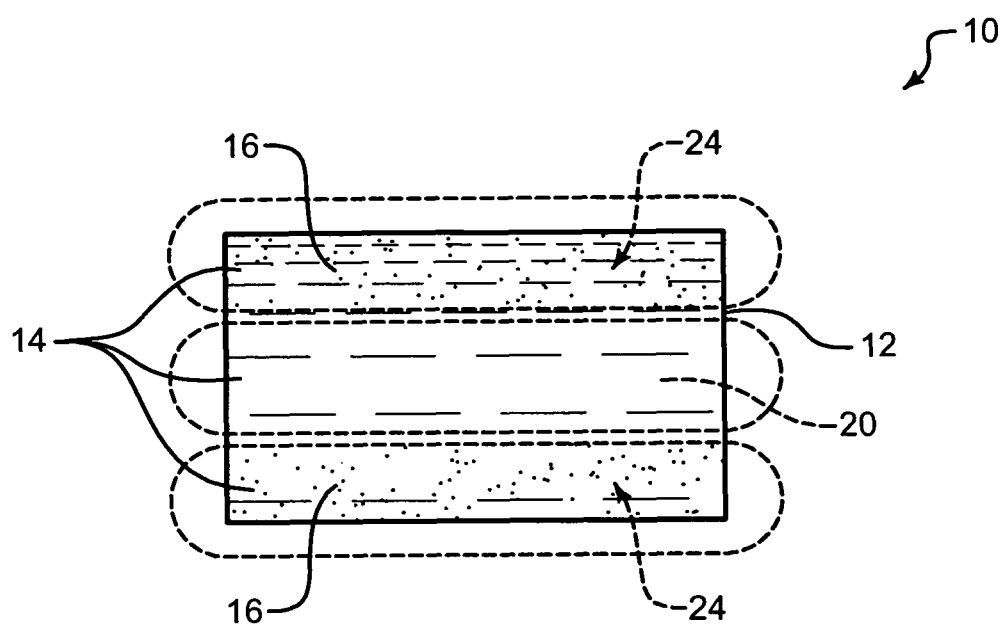
FIGS. 1D-1F are side plan views in partial schematic form of illustrative nuclear fission reactors.

In some other embodiments and referring to FIG. 1C and 1D, the solution 14 and the fertile nuclear fission fuel material 16 may be distributed heterogeneously in the reactor vessel 12. The heterogeneous distribution may be any heterogeneous distribution as desired and is not intended to be limited to heterogeneous distributions shown in the drawings.

Given by way of non-limiting example and as shown in FIG. 1C, in some embodiments a portion 18 of the solution 14 may be received in a fission region 20 of the reactor vessel 12. The fertile nuclear fission fuel material 16 and a portion 22 of the solution 14 may be received in a fertile blanket region 24 of the reactor vessel 12. In such embodiments, the fertile blanket region 24 is in hydraulic communication with the fission region 20 (because the liquid carrier material occupies the fission region 20 and the fertile blanket region 24) and neutronic communication with the fission region 20 (because the solution 14 of the fissile nuclear fission fuel material dissolved in the neutronically translucent liquid carrier material occupies the fission region 20 and the fertile blanket region 24).

Figure 1E:
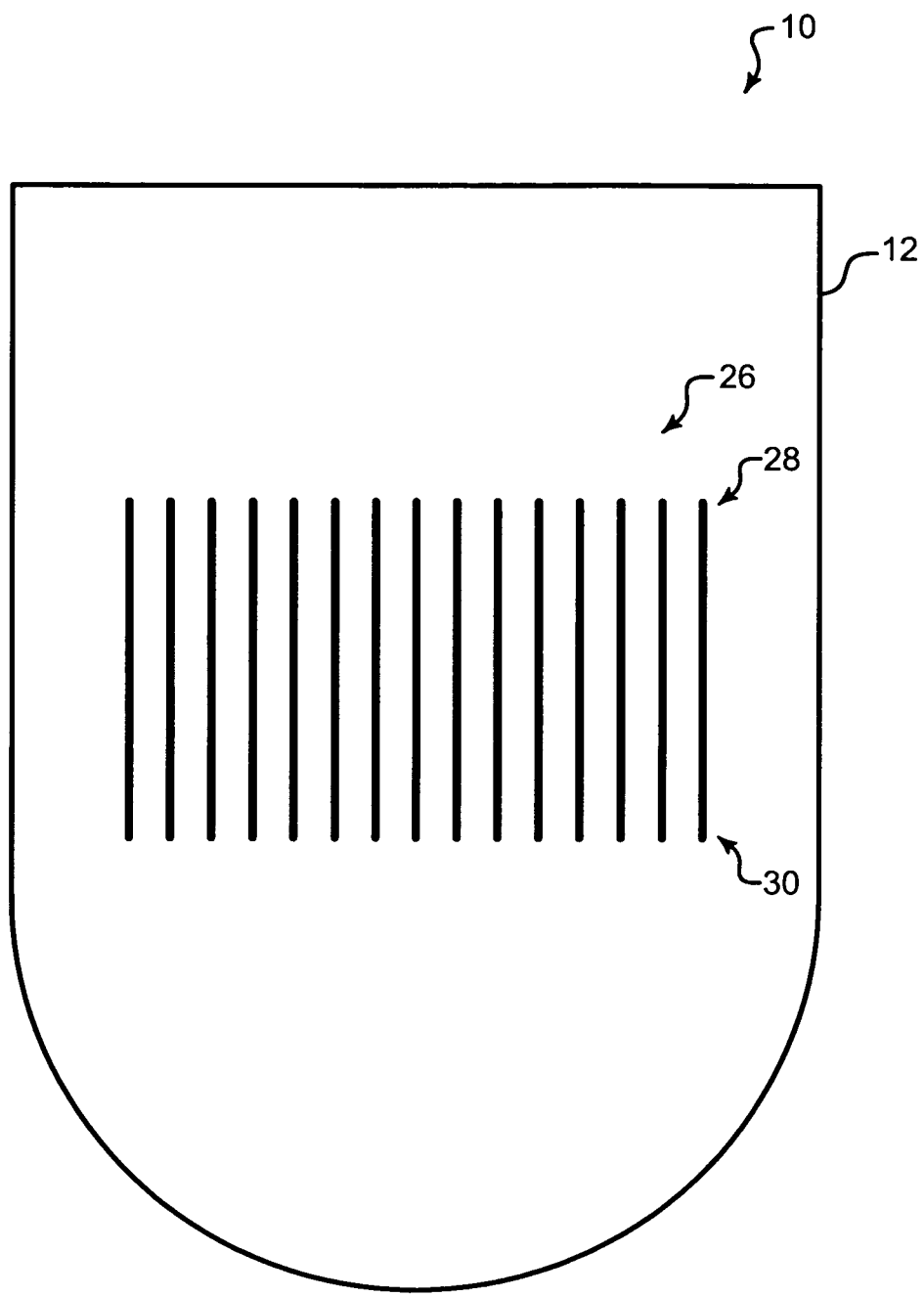

In other embodiments and referring now to FIG. 1E, nuclear fission fuel pins 26 may be received in the reactor vessel 12. Each nuclear fission fuel pin 26 has an axial end 28 and an axial end 30.

Figure 1F:
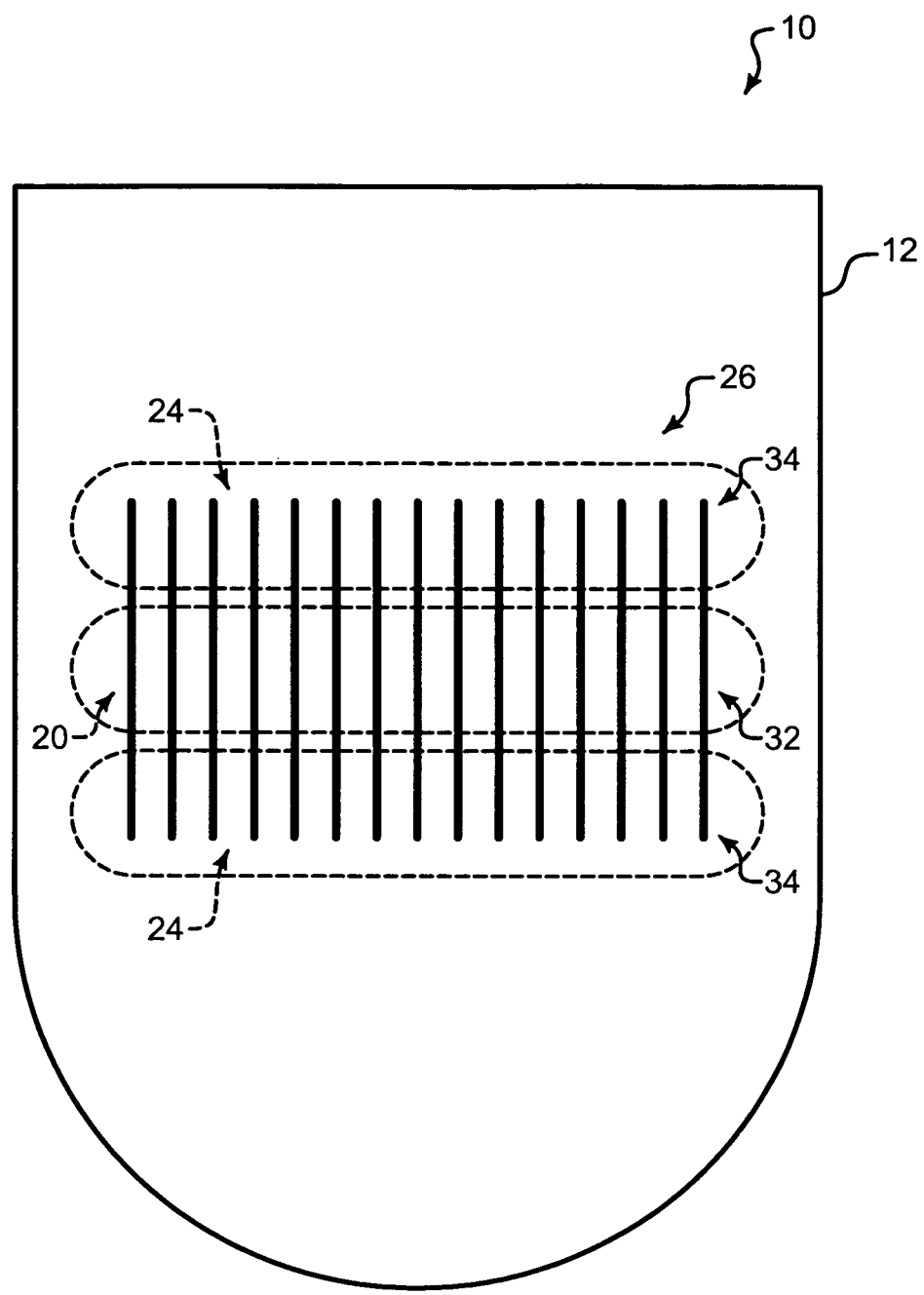

Referring additionally to FIG. 1F, in some embodiments a portion 32 of at least one of the nuclear fission fuel pins 26 may be disposed in the fission region 20 and at least a portion 34 of the at least one nuclear fission fuel pin 26 may be disposed in a fertile blanket region 24.

Figure 1G:
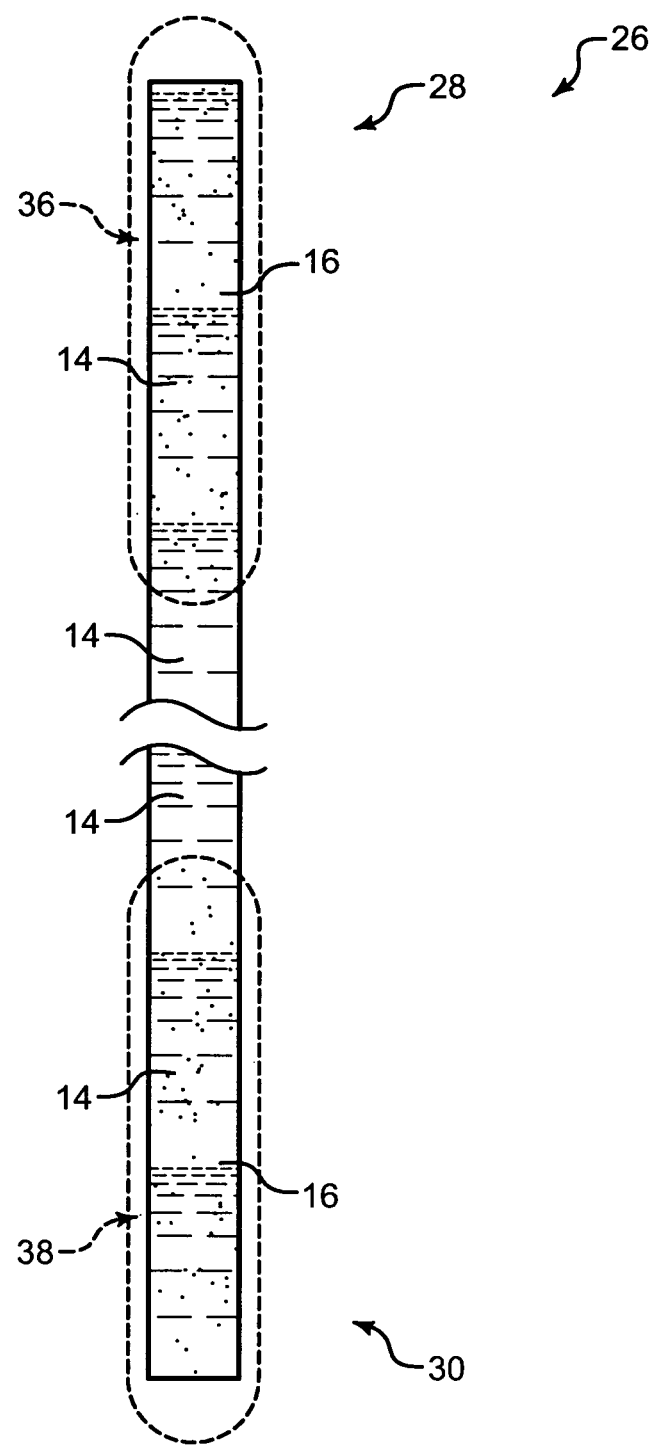
FIG. 1G is a side plan view in partial schematic form of an illustrative nuclear fission fuel pin.

Referring additionally to FIG. 1G, in some embodiments the solution 14 is distributed throughout each of the plurality of nuclear fission fuel pins 26 and the fertile nuclear fission fuel material 16 may be received in fertile blanket zones 36 and 38 disposed toward the axial ends 28 and 30. Thus, it will be appreciated that in some embodiments a fertile blanket region 24 (FIG. 1F) could be located toward the axial ends 28 of the nuclear fission fuel pins 26 and another fertile blanket region 24 (FIG. 1F) could be located toward the axial ends 30 of the nuclear fission fuel pins 26.

Figure 1H:
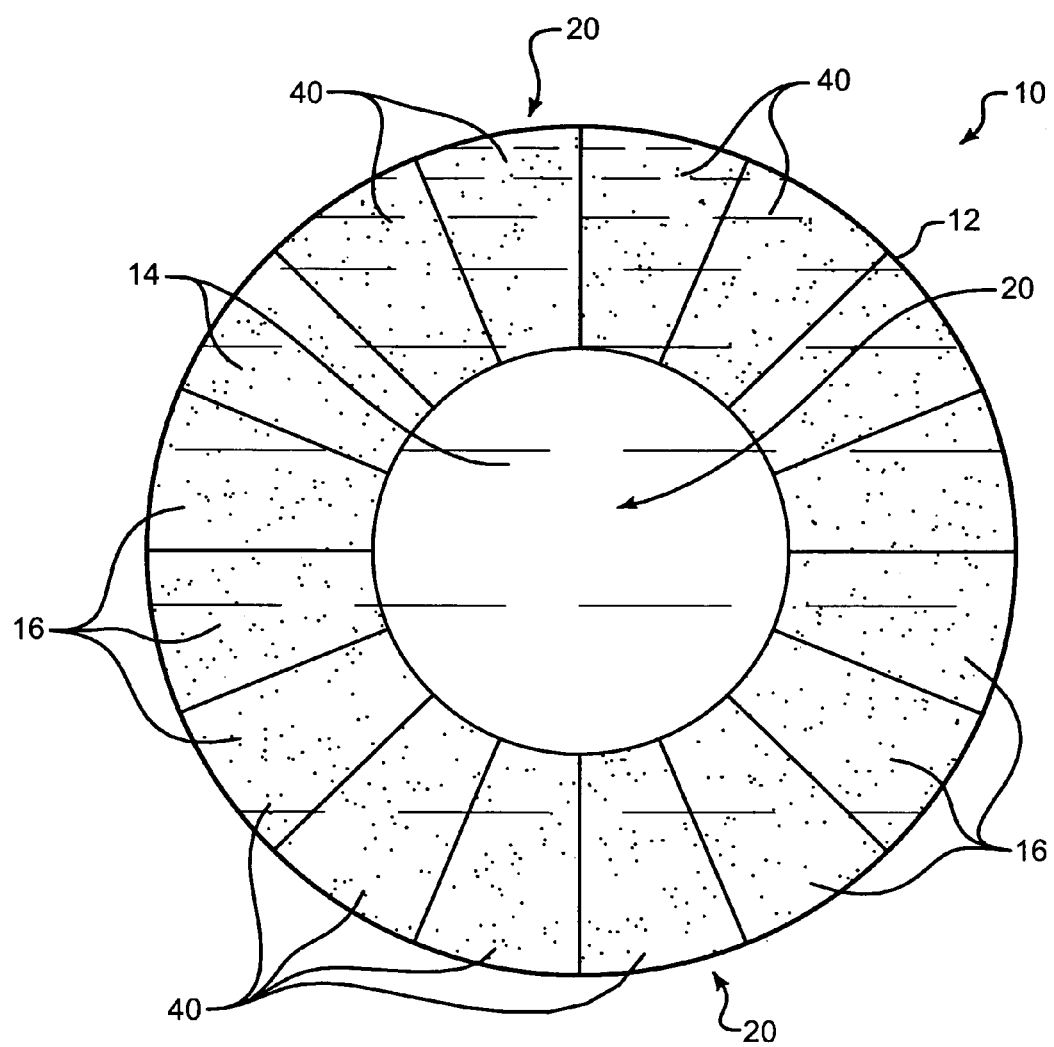
FIG. 1H is a top plan view in partial schematic form of an illustrative nuclear fission reactor.
Figure 1I:
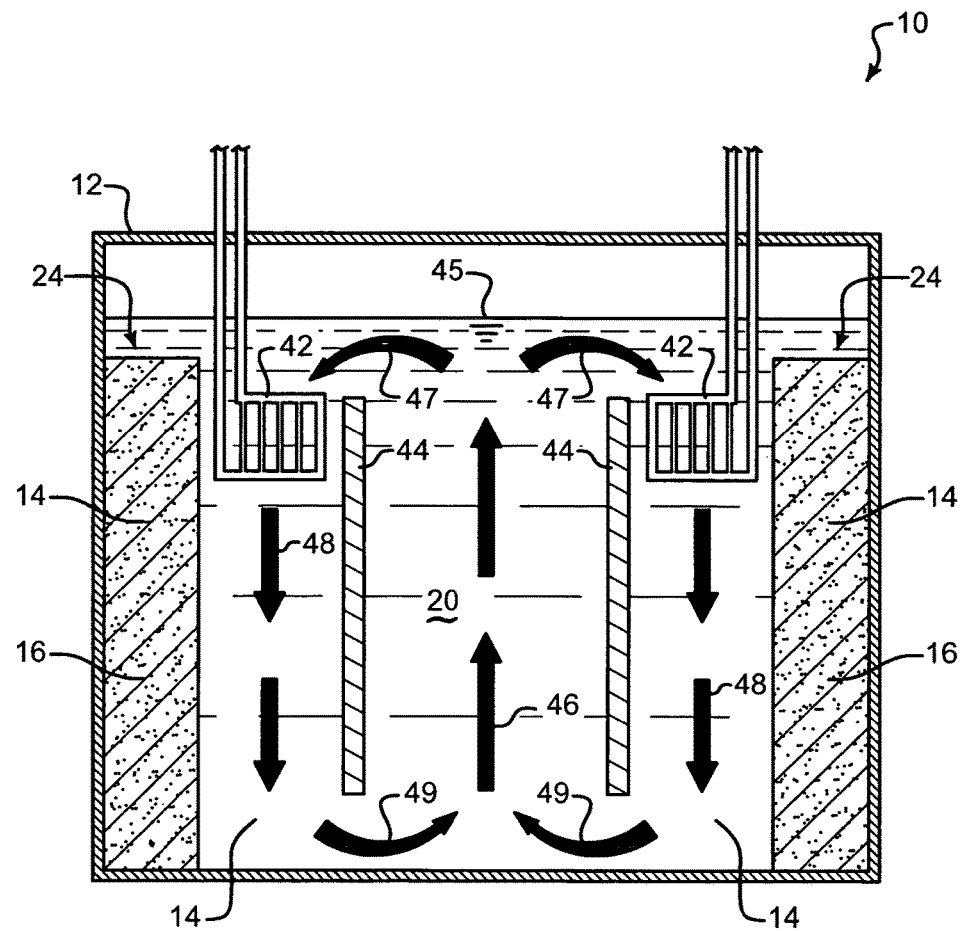
FIG. 1I is a side plan view in partial schematic form of an illustrative nuclear fission reactor.
Figure 1J:
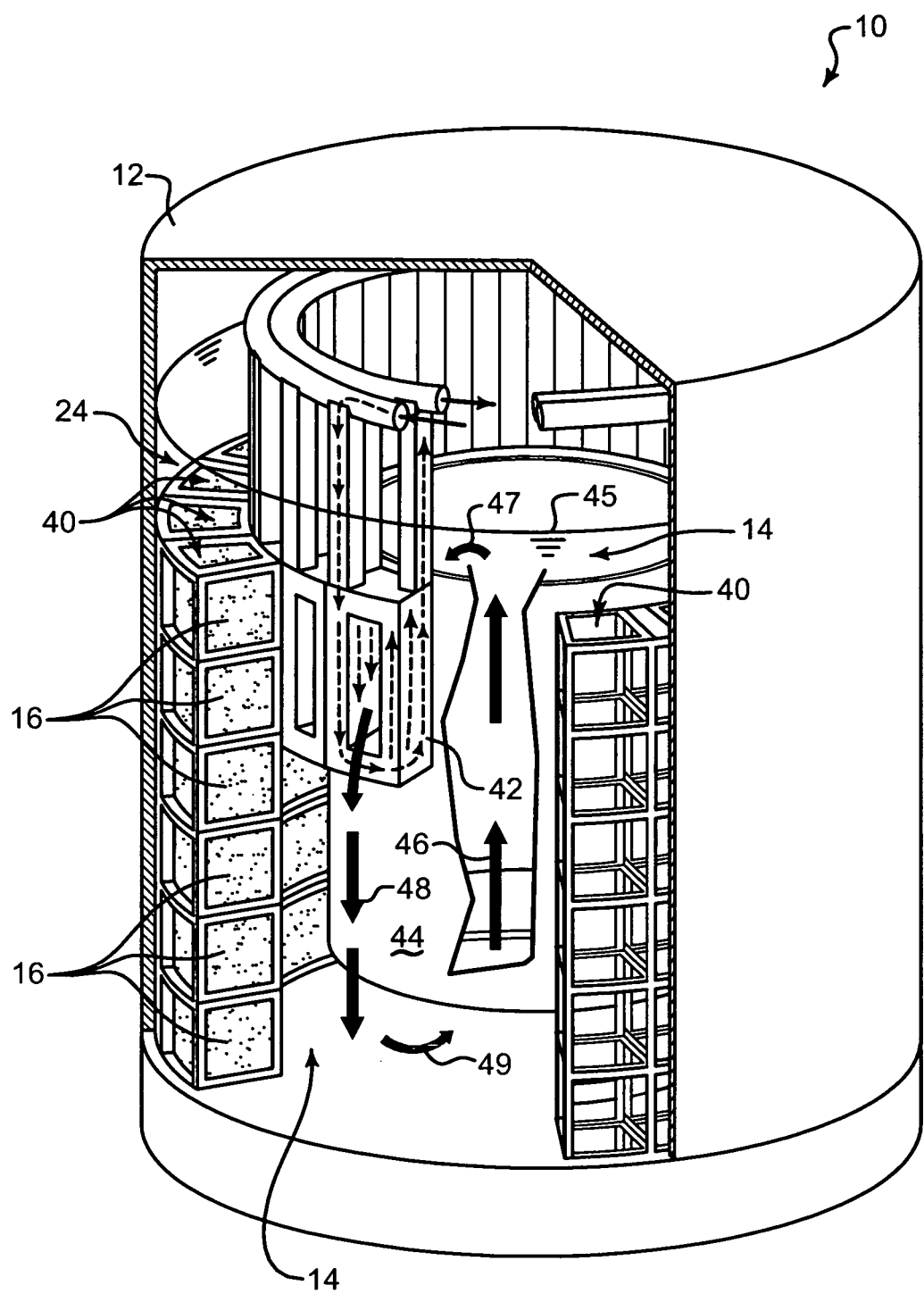
FIG. 1J is a perspective view in partial cutaway of an illustrative nuclear fission reactor.

Referring now to FIGS. 1H and 1J, in some embodiments fertile blanket modules 40 may be disposed in the fertile blanket region 20. In such embodiments the fertile nuclear fission fuel material 16 is received in the fertile blanket modules 40.

Referring now to FIGS. 1I and 1J, in some embodiments at least one heat exchanger element 42 may be disposed in thermal communication with the solution 14. FIG. 1I represents a general depiction of an embodiment in partial schematic form while FIG. 1J represents a more detailed view of an embodiment that includes the fertile blanket modules 40. In some cases, the heat exchanger element 42 may be immersed in the solution 14. Also, in some cases an annulus 44 may be disposed in the reactor vessel 12 adjacent the heat exchanger element 42 such that natural circulation of the solution may be established through the heat exchanger element 42 and around the annulus 44.

To that end, the reactor vessel 12 is filled with the solution 14 up to a level 45 that is above the heat exchanger element 42 and the annulus 44. In such an arrangement, heat from fission in the fission region 20 causes the fissile solution 14 to rise, as indicated by arrow 46. The rising solution 14 flows around the annulus 44 into the heat exchanger element 42, as indicated by arrows 47. The heat exchanger element 42 cools the solution 14 that flows therethrough. The solution 14 that has been cooled by the heat exchanger element 42 moves downwardly as indicated by arrows 48. The downwardly-flowing solution 14 flows around the annulus 44 and into the fission region 20, as indicated by arrows 49, thereby establishing a natural circulation loop.

It will be appreciated that reactivity may be controlled in any manner as desired. For example, given by way of illustration and not of limitation, reactivity may be controlled by way of any one or more illustrative reactivity control methodologies, such as without limitation: dissolving neutron absorbing poisons in the liquid carrier material; inserting and extracting control rods (not shown) of neutron absorbing material into and out of the solution 14; redistributing the fertile nuclear fission fuel material 16 and the fissile nuclear fission fuel material as desired; adding neutronically translucent liquid carrier material to reduce concentration of fissile nuclear fission fuel material in the neutronically translucent liquid carrier material; inserting neutronically translucent material to displace the solution 14 (that contains fissile nuclear fission fuel material); and/or the like.

Reactivity may be controlled in similar manners in all embodiments disclosed herein. As such, for the sake of brevity, details of reactivity control need not be repeated in all embodiments for an understanding of the disclosed embodiments.

Now that an overview of embodiments and aspects has been set forth, additional embodiments, aspects, and illustrative details will be described. In the interest of brevity, details for components that are common to previously-described embodiments need not and will not be repeated, and the same reference numbers will be re-used.

Figure 2A:
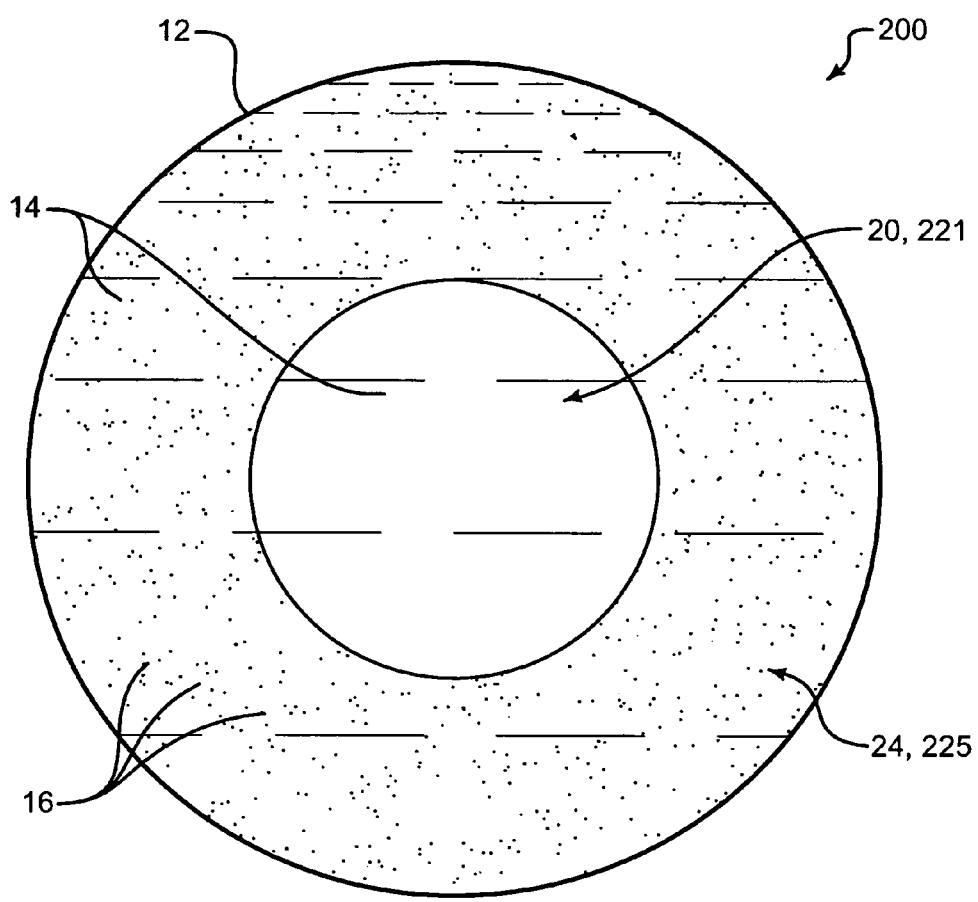
FIG. 2A is a top plan view in partial schematic form of an illustrative nuclear fission reactor.
Figure 2B:
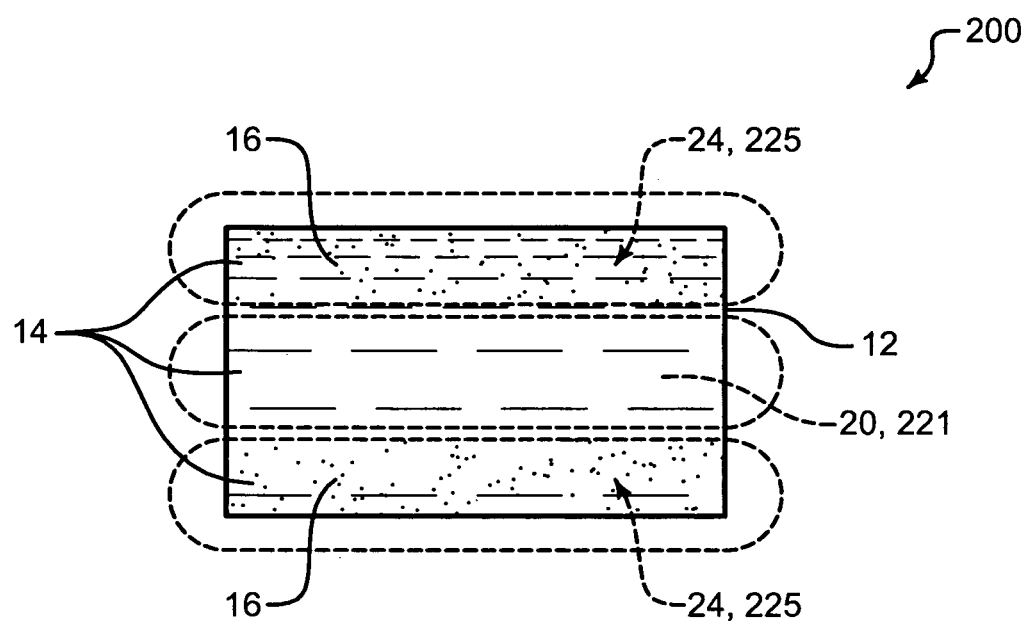
FIG. 2B is a side plan view in partial schematic form of an illustrative nuclear fission reactor.

Referring now to FIGS. 2A and 2B, a nuclear fission reactor 200 includes a reactor vessel 12 having a solution 14 of fissile nuclear fission material dissolved in neutronically translucent liquid carrier material. The reactor vessel 12 defines a fission region 20 toward a centralized region 221 of the reactor vessel 12 and a fertile blanket region 24 toward a peripheral region 225 of the reactor vessel 12. Undissolved fertile nuclear fission fuel material 16 is disposed in the fertile blanket region 24 in contact with the solution. The fertile nuclear fission fuel material 16 is transmutable into the fissile nuclear fission material.

In some embodiments the reactor vessel 12 may be cylindrical. In such cases and as shown in FIG. 2A, the peripheral region 225 may include a radially peripheral region. However, the reactor vessel 12 need not be cylindrical, and may have any shape as desired. Regardless of shape of the reactor vessel 12 and as shown in FIG. 2B, in some embodiments the peripheral region 225 may include an axially peripheral region. As also shown in FIG. 2B, it will be appreciated that fertile blanket regions 24 may be established at both axially peripheral regions 225. However, it will also be appreciated that fertile blanket regions 24 need not be established at both axially peripheral regions 225. To that end and in some embodiments, a fertile blanket region 24 may be established at either one but not both of the axially peripheral regions 225.

Some aspects that previously have been explained in detail will be mentioned briefly below. As discussed above, solubility of the fissile nuclear fission fuel material in the neutronically translucent liquid carrier material is greater than solubility of the fertile nuclear fission fuel material 16 in the neutronically translucent liquid carrier material. In some embodiments and as mentioned above, the fissile nuclear fission fuel material is solvable in the neutronically translucent liquid carrier material, thereby making the solution 14. In some embodiments, the fertile nuclear fission fuel material 16 is substantially insoluble in the neutronically translucent liquid carrier material.

In various embodiments, the neutronically translucent liquid carrier material may include liquid materials such as Mg, Ag, Ca, Ni, and the like. In some embodiments the fissile nuclear fission fuel material may include $^{239}$Pu. Also, in some embodiments the fertile nuclear fission fuel material 16 may include $^{238}$U.

As mentioned above, the undissolved fertile nuclear fission fuel material 16 is disposed in contact with the solution 14. In some embodiments, the fertile nuclear fission fuel material 16 may be in direct physical contact with the neutronically translucent liquid carrier material. Moreover, in some embodiments the fertile nuclear fission fuel material 16 may be suspended in the neutronically translucent liquid carrier material.

In some embodiments the fertile nuclear fission fuel material 16 may be provided in solid form. In various embodiments, the fertile nuclear fission fuel material may be provided various forms such as granular form, wire form, plate form, foam form, and the like.

Figure 2C:
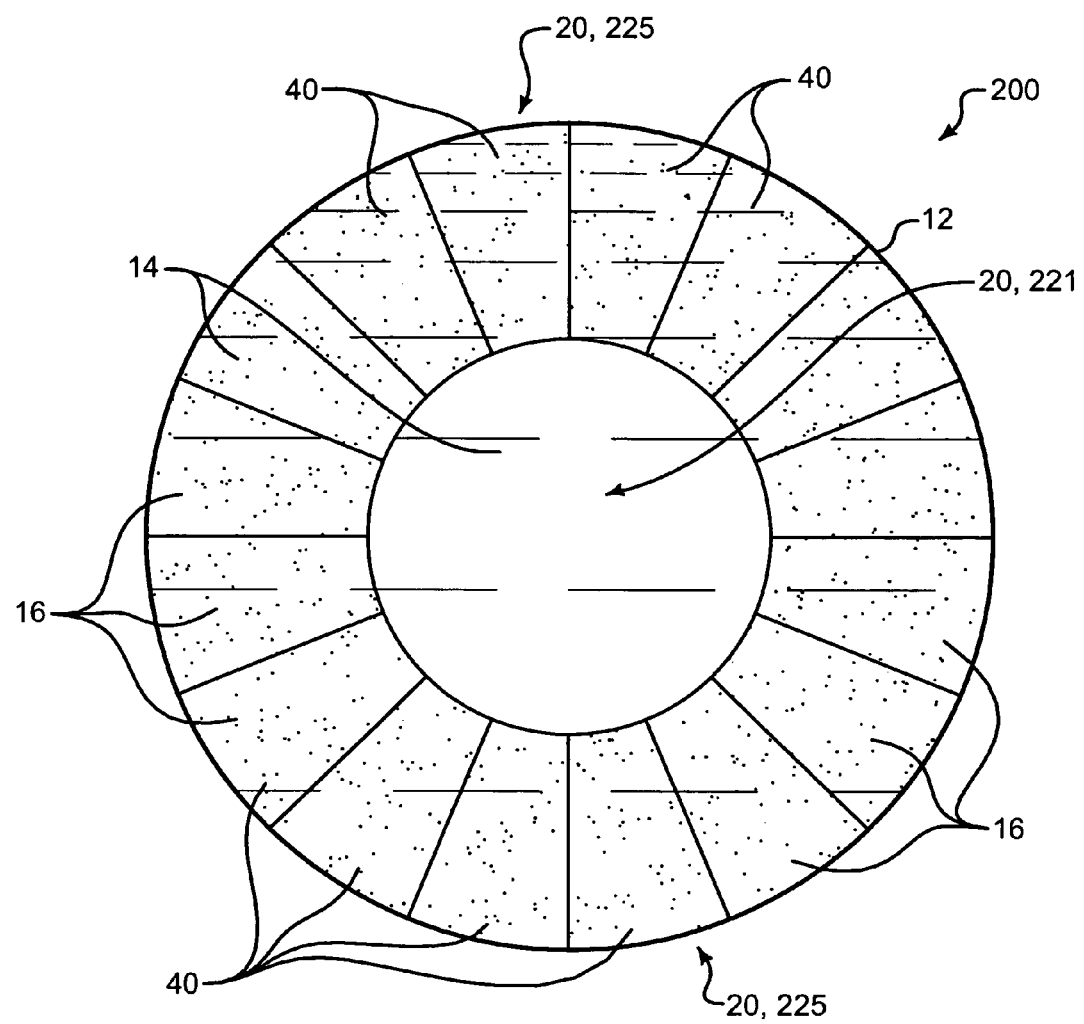
FIG. 2C is a top plan view in partial schematic form of an illustrative nuclear fission reactor.
Figure 2D:
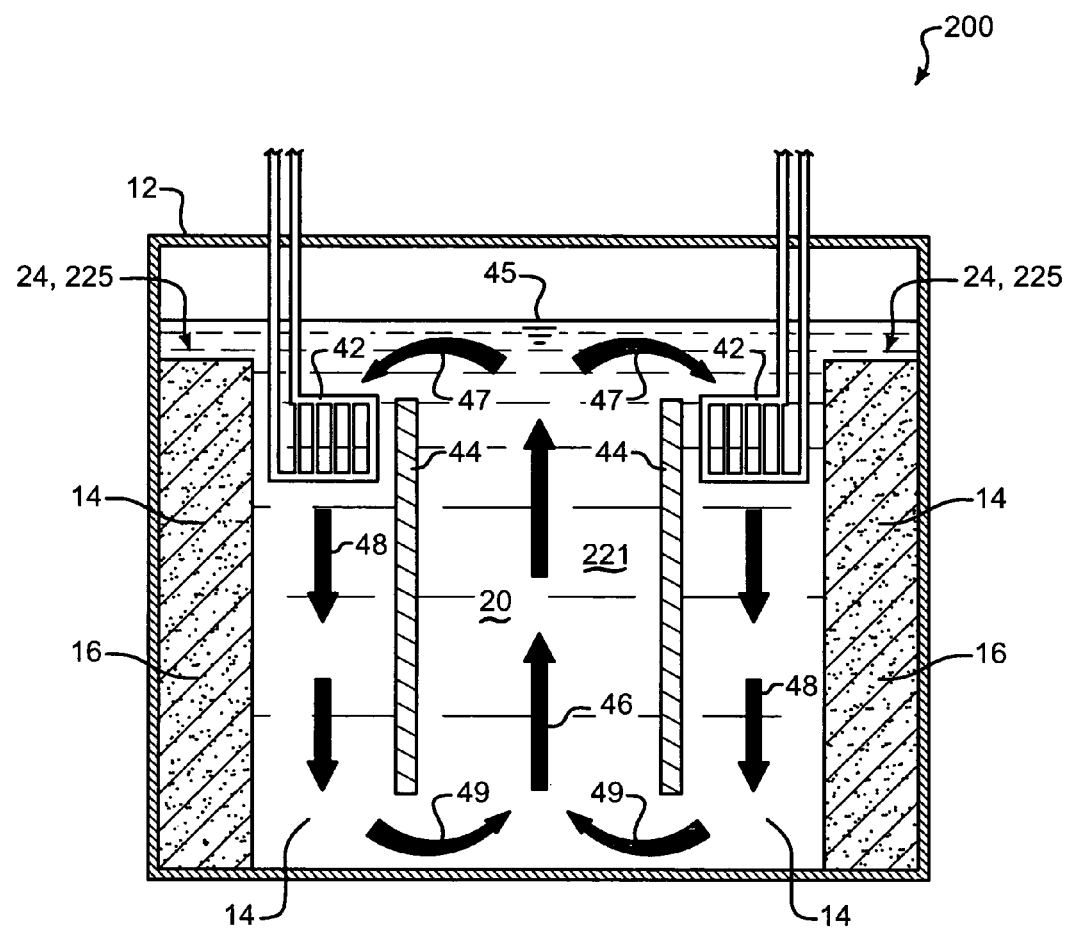
FIG. 2D is a side plan view in partial schematic form of an illustrative nuclear fission reactor.
Figure 2E:
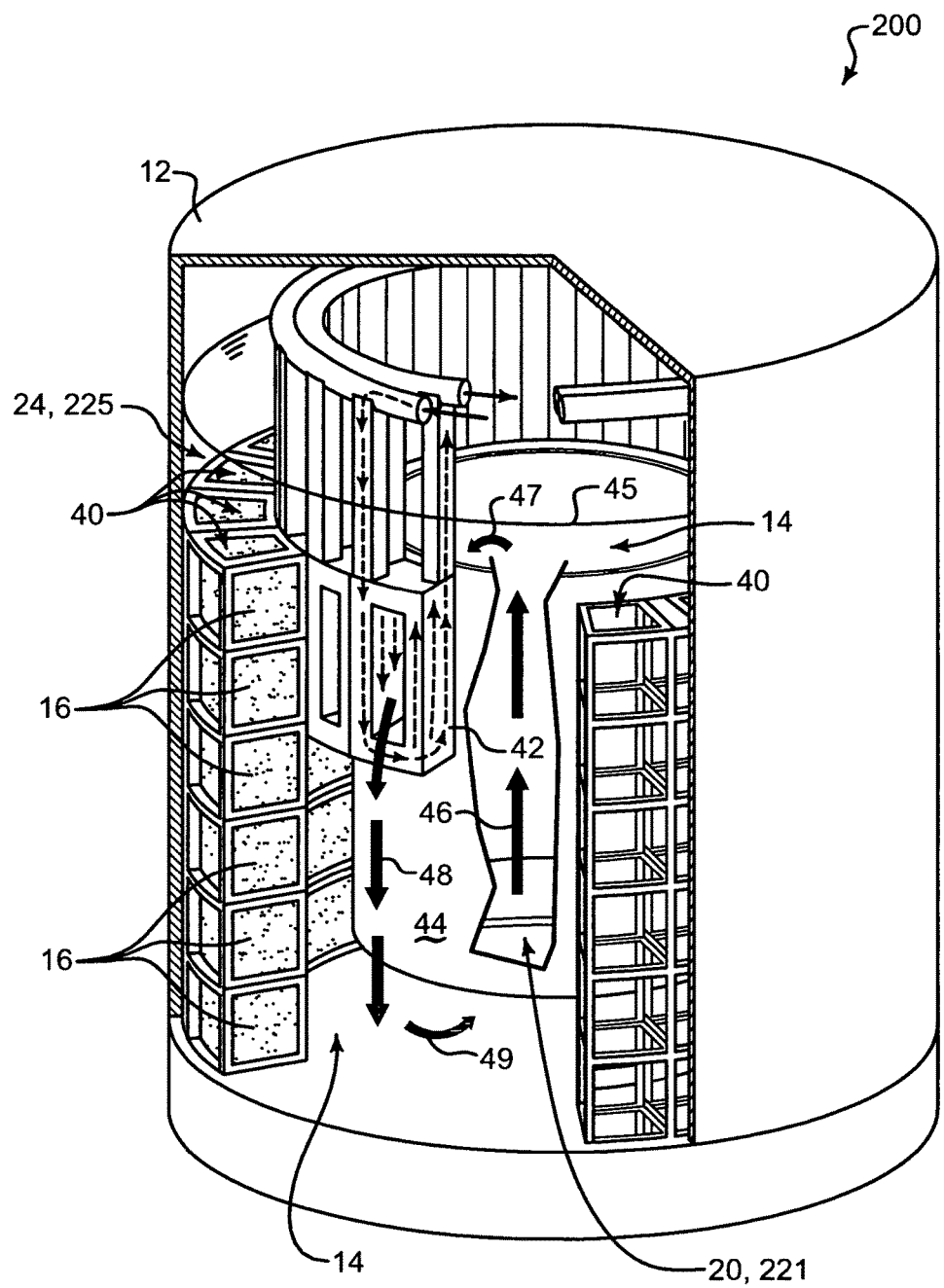
FIG. 2E is a perspective view in partial cutaway of an illustrative nuclear fission reactor.

Referring now to FIGS. 2C and 2E, in some embodiments fertile blanket modules 40 may be disposed in the fertile blanket region 20 toward the peripheral region 225. In such embodiments the fertile nuclear fission fuel material 16 is received in the fertile blanket modules 40.

Referring now to FIGS. 2D and 2E, in some embodiments at least one heat exchanger element 42 may be disposed in thermal communication with the solution 14. FIG. 2D represents a general depiction of an embodiment in partial schematic form while FIG. 2E represents a more detailed view of an embodiment that includes the fertile blanket modules 40 disposed toward the peripheral region 225. In some cases, the heat exchanger element 42 may be immersed in the solution 14. Also, in some cases an annulus 44 may be disposed in the reactor vessel 12 adjacent the heat exchanger element 42 such that natural circulation of the solution may be established through the heat exchanger element 42 and around the annulus 44. Details are similar to those described above with reference to FIGS. 1H-1J and need not be repeated.

Figure 3A:
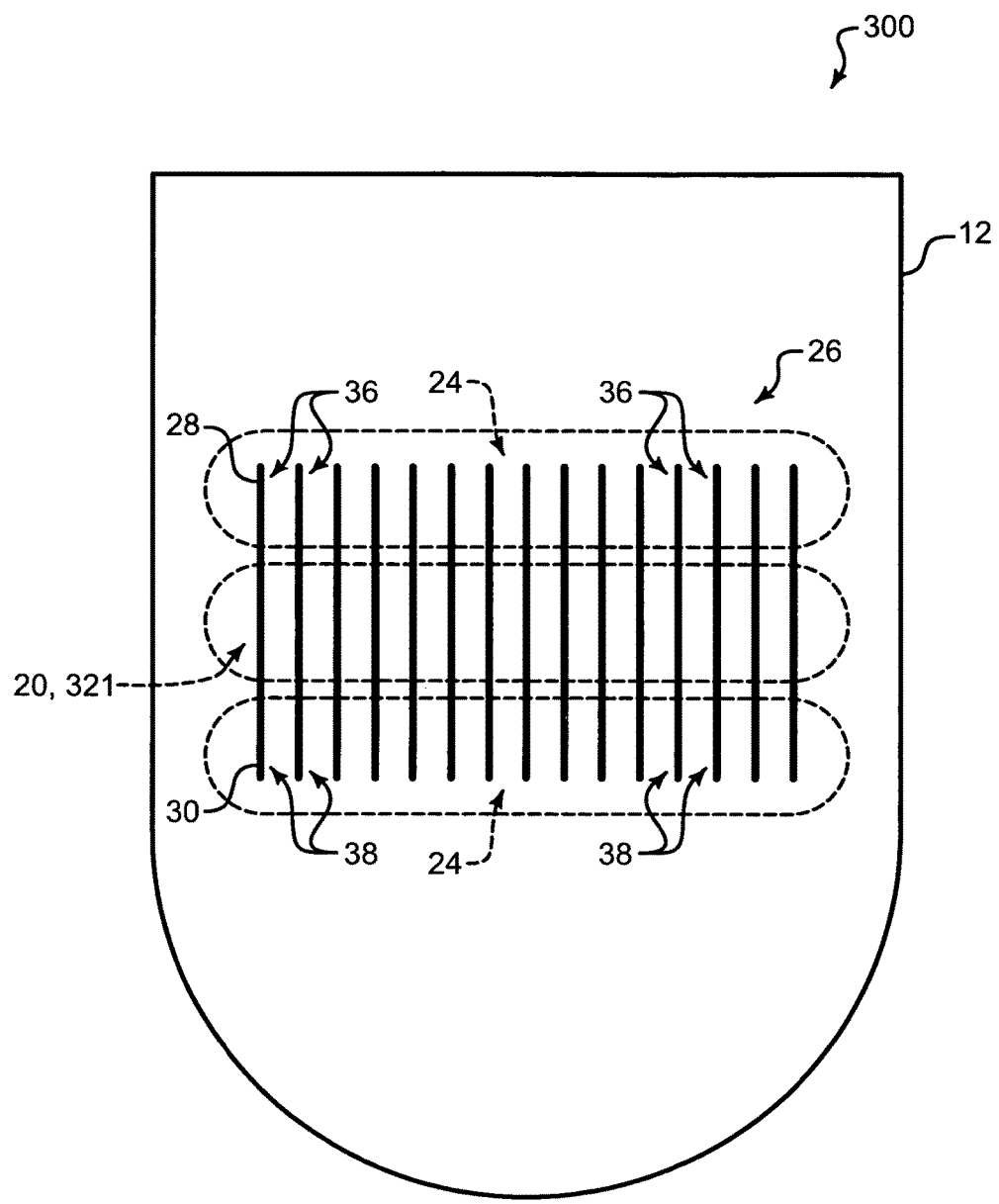
FIG. 3A is a side plan view in partial schematic form of an illustrative nuclear fission reactor.

Referring now to FIG. 3A, in another illustrative embodiment a nuclear fission reactor 300 includes a reactor vessel 12 and nuclear fission fuel pins 26 received in the reactor vessel 12. Each nuclear fission fuel pin has an axial end 28 and an axial end 30. A solution 14 of fissile nuclear fission material is dissolved in neutronically translucent liquid carrier material, and the solution 14 is distributed throughout each nuclear fission fuel pin 26. A centralized axial region 321 of the nuclear fission fuel pins 26 defines a fission region 20 of the reactor vessel 12. Undissolved fertile nuclear fission fuel material 16 is disposed in contact with the solution in fertile blanket zones 36 and 38 disposed toward the axial ends 28 and 30, respectively, of each nuclear fission fuel pin 26. The fertile nuclear fission fuel material 16 is transmutable into the fissile nuclear fission material. The fertile blanket zones 36 and 38 of the nuclear fission fuel pins 26 define the fertile blanket regions 24.

An illustrative nuclear fission fuel pin 26 has been discussed above with reference to FIG. 1G, and its details need not be repeated. Some aspects that previously have been explained in detail will be mentioned briefly below.

As discussed above, solubility of the fissile nuclear fission fuel material in the neutronically translucent liquid carrier material is greater than solubility of the fertile nuclear fission fuel material 16 in the neutronically translucent liquid carrier material. In some embodiments and as mentioned above, the fissile nuclear fission fuel material is solvable in the neutronically translucent liquid carrier material, thereby making the solution 14. In some embodiments, the fertile nuclear fission fuel material 16 is substantially insoluble in the neutronically translucent liquid carrier material.

In various embodiments, the neutronically translucent liquid carrier material may include liquid materials such as Mg, Ag, Ca, Ni, and the like. In some embodiments the fissile nuclear fission fuel material may include $^{239}$Pu. Also, in some embodiments the fertile nuclear fission fuel material 16 may include $^{238}$U.

As mentioned above, the undissolved fertile nuclear fission fuel material 16 is disposed in contact with the solution 14. In some embodiments, the fertile nuclear fission fuel material 16 may be in direct physical contact with the neutronically translucent liquid carrier material. Moreover, in some embodiments the fertile nuclear fission fuel material 16 may be suspended in the neutronically translucent liquid carrier material.

In some embodiments the fertile nuclear fission fuel material 16 may be provided in solid form. In various embodiments, the fertile nuclear fission fuel material may be provided various forms such as granular form, wire form, plate form, foam form, and the like.

Illustrative Nuclear Fission Fuel Pins

Figure 4A:
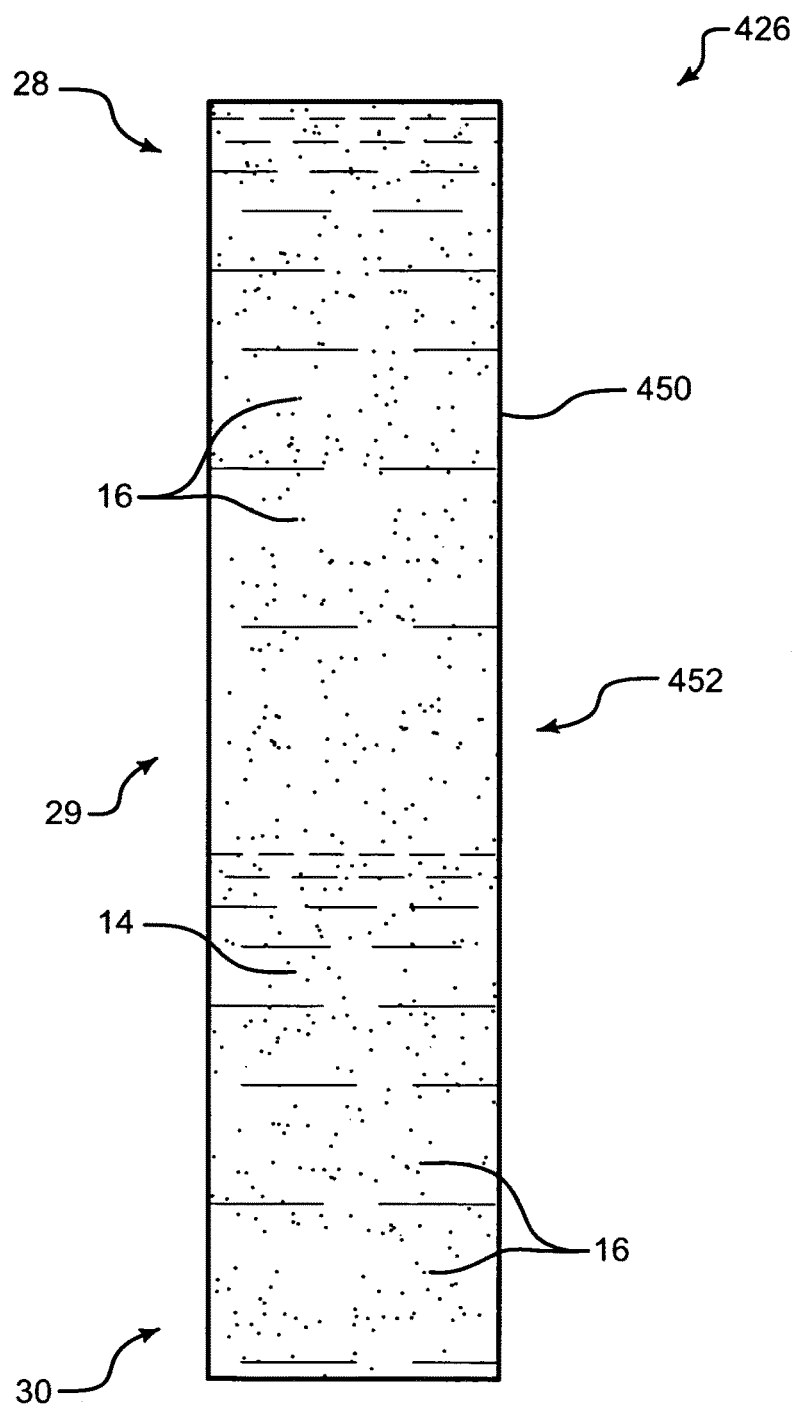
FIGS. 4A-4C are side plan views in partial schematic form of illustrative nuclear fission fuel pins.

Referring now to FIG. 4A, in another illustrative embodiment a nuclear fission fuel pin 426 includes cladding 450 that defines an elongated enclosure 452. A solution 14 of fissile nuclear fission fuel material is dissolved in neutronically translucent liquid carrier material. The solution 14 is distributed throughout the elongated enclosure 452. Undissolved fertile nuclear fission fuel material 16 is disposed in contact with the solution 14 in the elongated enclosure 452. The fertile nuclear fission fuel material 16 is transmutable into the fissile nuclear fission fuel material.

In some embodiments the elongated enclosure 452 has axial ends 28 and 30 and a centralized axial region 29 between the axial ends 28 and 30.

Still referring to FIG. 4A, the solution 14 and the fertile nuclear fission fuel material 16 may be distributed in the elongated enclosure 452 in any manner as desired. To that end, no limitation is implied, and is not to be inferred, from the illustration shown in FIG. 4A. In some embodiments the solution 14 and the fertile nuclear fission fuel material 16 may be distributed homogeneously in the elongated enclosure 452.

Figure 4B:
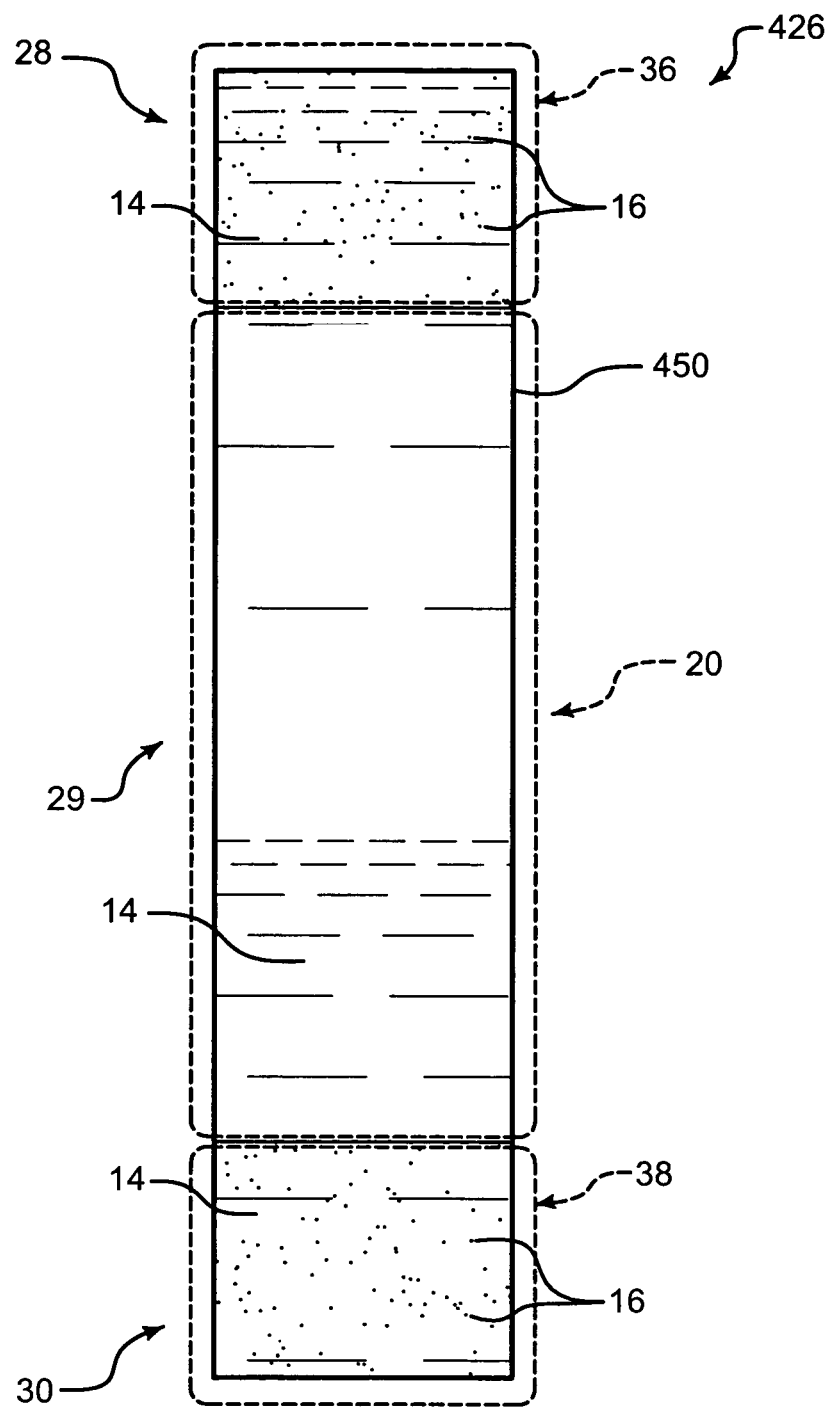

Referring now to FIG. 4B, in some other embodiments the solution 14 and the fertile nuclear fission fuel material 16 may be distributed heterogeneously in the elongated enclosure 452. The heterogeneous distribution may be any heterogeneous distribution as desired and is not intended to be limited to heterogeneous distributions shown in the drawings.

Still referring to FIG. 4B, in some embodiments the centralized axial region 29 defines a fission region 20 of the nuclear fission fuel pin 426.

In some embodiments the fertile nuclear fission fuel material 16 may be disposed toward the axial ends 28 and 30. In such cases, the axial ends 28 and 30 may define fertile blanket zones 36 and 38, respectively, of the nuclear fission fuel pin 426.

Some aspects that previously have been explained in detail will be mentioned briefly below.

Referring now to FIGS. 4A and 4B and as discussed above, solubility of the fissile nuclear fission fuel material in the neutronically translucent liquid carrier material is greater than solubility of the fertile nuclear fission fuel material 16 in the neutronically translucent liquid carrier material. In some embodiments and as mentioned above, the fissile nuclear fission fuel material is solvable in the neutronically translucent liquid carrier material, thereby making the solution 14. In some embodiments, the fertile nuclear fission fuel material 16 is substantially insoluble in the neutronically translucent liquid carrier material.

In various embodiments, the neutronically translucent liquid carrier material may include liquid materials such as Mg, Ag, Ca, Ni, and the like. In some embodiments the fissile nuclear fission fuel material may include $^{239}$Pu. Also, in some embodiments the fertile nuclear fission fuel material 16 may include $^{238}$U.

As mentioned above, the undissolved fertile nuclear fission fuel material 16 is disposed in contact with the solution 14. In some embodiments, the fertile nuclear fission fuel material 16 may be in direct physical contact with the neutronically translucent liquid carrier material. Moreover, in some embodiments the fertile nuclear fission fuel material 16 may be suspended in the neutronically translucent liquid carrier material.

In some embodiments the fertile nuclear fission fuel material 16 may be provided in solid form. In various embodiments, the fertile nuclear fission fuel material may be provided various forms such as granular form, wire form, plate form, foam form, and the like.

Figure 4C:
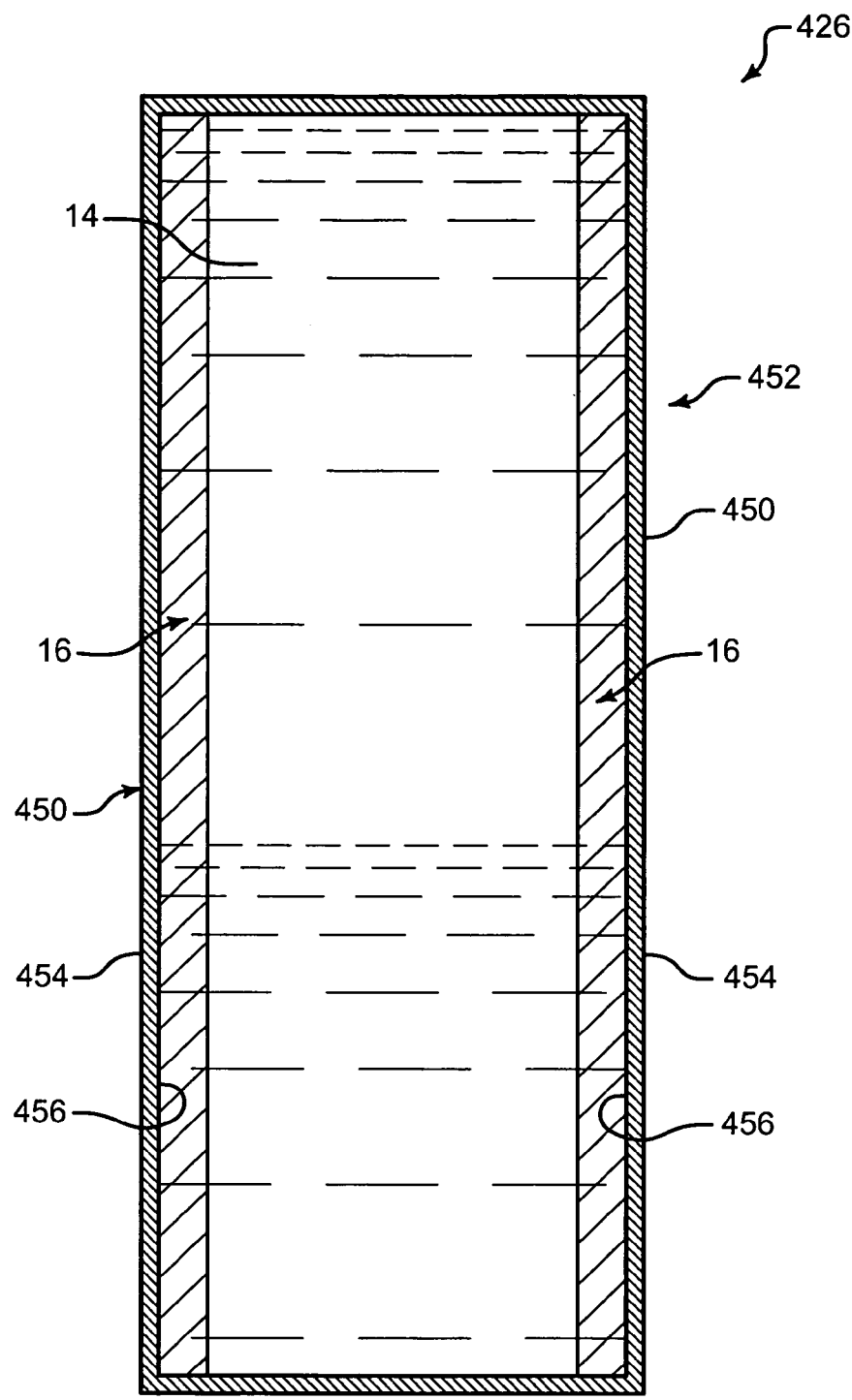

Referring now to FIG. 4C, in some embodiments the fertile nuclear fission fuel material 16 may disposed in contact with a wall of the elongated enclosure 452. Given by way of non-limiting example, the fertile nuclear fission fuel material 16 may be disposed in contact with an inner surface 456 of the wall 454.

Now that various embodiments including nuclear fission reactors and nuclear fission fuel pins have been discussed, other embodiments including various methods will be discussed below. Further illustrative details regarding neutronics and mass transfer will be set forth by way of non-limiting examples.

Illustrative Methods

Following are a series of flowcharts depicting implementations. For ease of understanding, the flowcharts are organized such that the initial flowcharts present implementations via an example implementation and thereafter the following flowcharts present alternate implementations and/or expansions of the initial flowchart as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Illustrative details regarding the fissile nuclear fission fuel material, the neutronically translucent carrier material, the solution of the fissile nuclear fission fuel material dissolved in the neutronically translucent carrier material, and the fertile nuclear fission fuel material have been discussed above and need not be repeated in the context of the following illustrative, non-limiting methods.

Figure 5A:
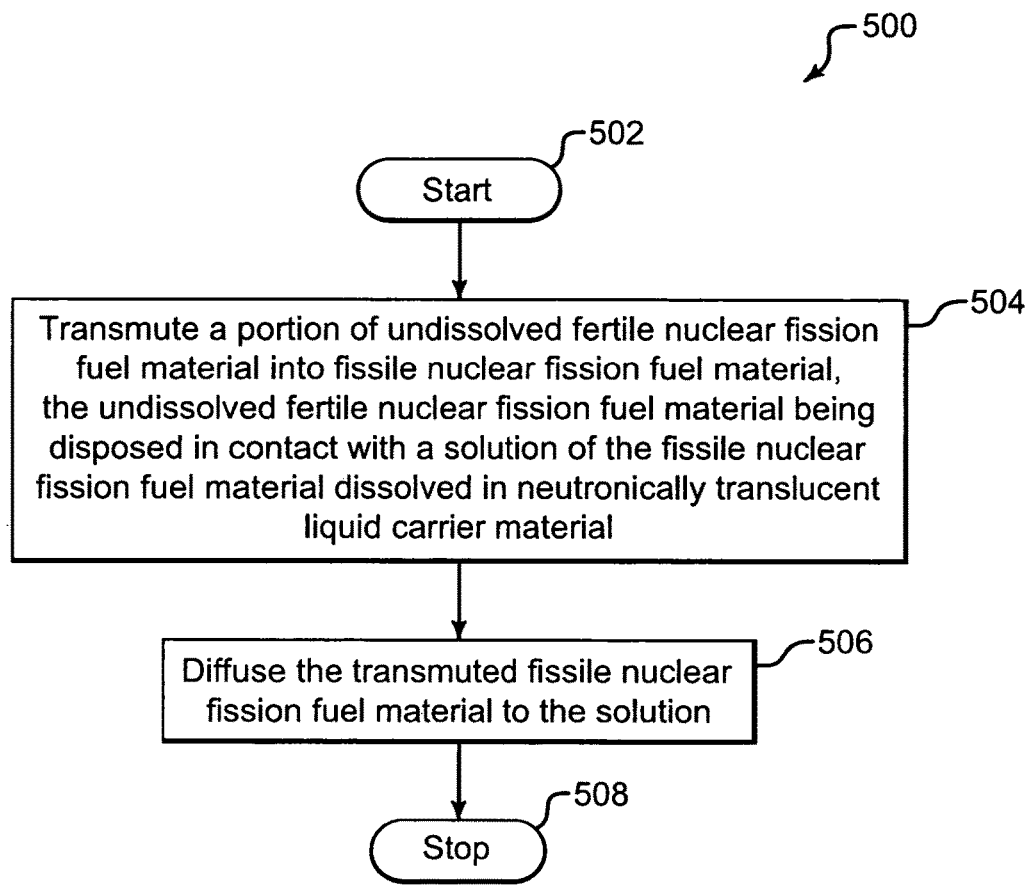
FIG. 5A is a flowchart of an illustrative method of operating a nuclear fission reactor.

Referring now to FIG. 5A, in an embodiment an illustrative method 500 is provided for operating a nuclear fission reactor. The method 500 starts at a block 502. At a block 504 a portion of undissolved fertile nuclear fission fuel material is transmuted into fissile nuclear fission fuel material, with the undissolved fertile nuclear fission fuel material being disposed in contact with a solution of the fissile nuclear fission fuel material dissolved in neutronically translucent liquid carrier material. Given by way of example and not of limitation, when $^{238}$U is exposed to a neutron flux, the $^{238}$U will be transmuted to $^{239}$Pu. More particularly, when an atom of $^{238}$U is exposed to a neutron flux, its nucleus will capture a neutron, thereby changing it to $^{239}$U. The $^{239}$U then rapidly undergoes two beta decays. After the $^{238}$U absorbs a neutron to become $^{239}$U it then emits an electron and an anti-neutrino ($\bar{v}_e$) by $\beta^-$ decay to become $^{239}$Np and then emits another electron and anti-neutrino by a second $\beta^-$ decay to become $^{239}$Pu. At a block 506 the transmuted fissile nuclear fission fuel material is diffused to the solution. The method 500 stops at a block 508.

Figure 5B:
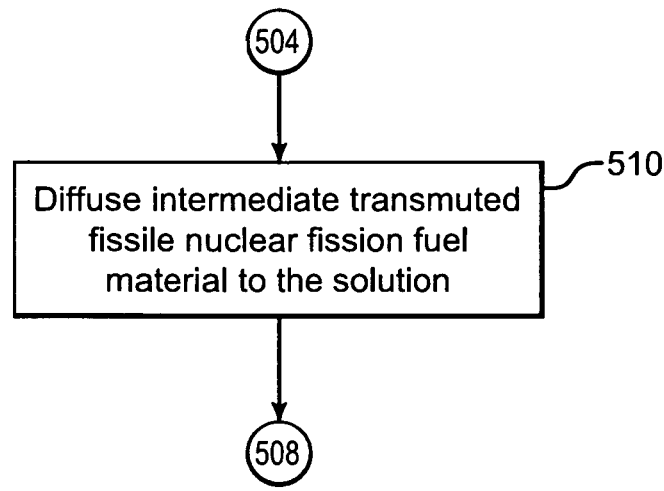
FIGS. 5B-5D are flowcharts of illustrative details of the method of FIG. 5A.

Referring additionally to FIG. 5B, in some embodiments at a block 510 intermediate transmuted material may be diffused to the solution. Given by way of non-limiting examples, as discussed above the intermediate transmuted material may include without limitation $^{239}$U and $^{239}$Np.

Figure 5C:
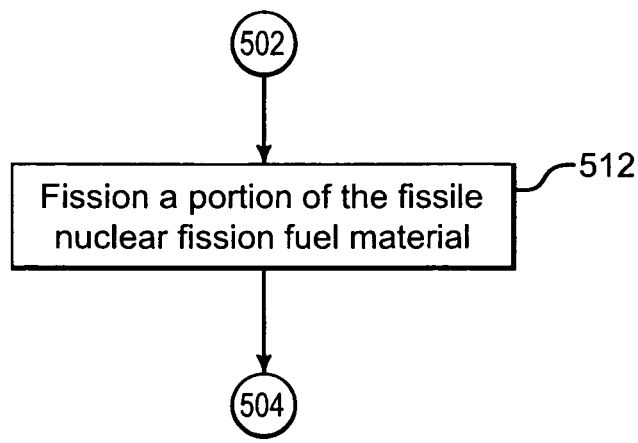

Referring additionally to FIG. 5C, in some embodiments at a block 512 a portion of the fissile nuclear fission fuel material fissions. In such cases, fissioning of the fissile nuclear fission fuel material can provide the neutron flux to which the fertile nuclear fission fuel material is exposed, thereby causing transmuting of a portion of undissolved fertile nuclear fission fuel material at the block 504 (FIG. 5A).

Figure 5D:
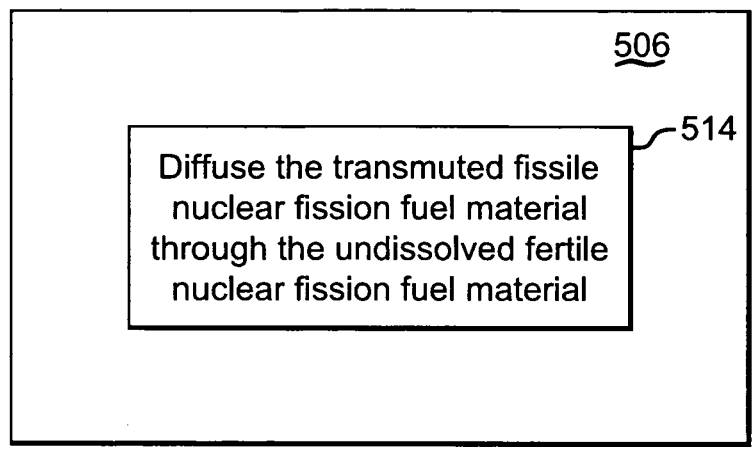

Referring additionally to FIG. 5D, in some embodiments diffusing the transmuted fissile nuclear fission fuel material to the solution at the block 506 may include diffusing the transmuted fissile nuclear fission fuel material through the undissolved fertile nuclear fission fuel material at a block 514. For example and as discussed above, regardless of form in which the fertile nuclear fission fuel material is provided, the larger the specific surface area provided by the form of the fertile nuclear fission fuel material, the greater the rate of diffusion of transmuted fissile nuclear fission fuel material through the fertile nuclear fission fuel material to the liquid carrier material. It will also be appreciated that, when the fertile nuclear fission fuel material is provided in granular form, a small particle size can help introduce a large concentration gradient (of dissolved fissile nuclear fission fuel material) without large differences in concentration (between transmuted fissile nuclear fission fuel material dissolved in the fertile nuclear fission fuel material and fissile nuclear fission fuel material dissolved in the neutronically translucent liquid carrier material). Thus a concentration of the fissile nuclear fission fuel material in the fertile nuclear fission fuel material is established that is greater than a concentration of the fissile nuclear fission fuel material in the neutronically translucent liquid carrier material. It is this concentration gradient that causes the transmuted fissile nuclear fission fuel material to diffuse through the fertile nuclear fission fuel material to the solution.

Figure 6A:
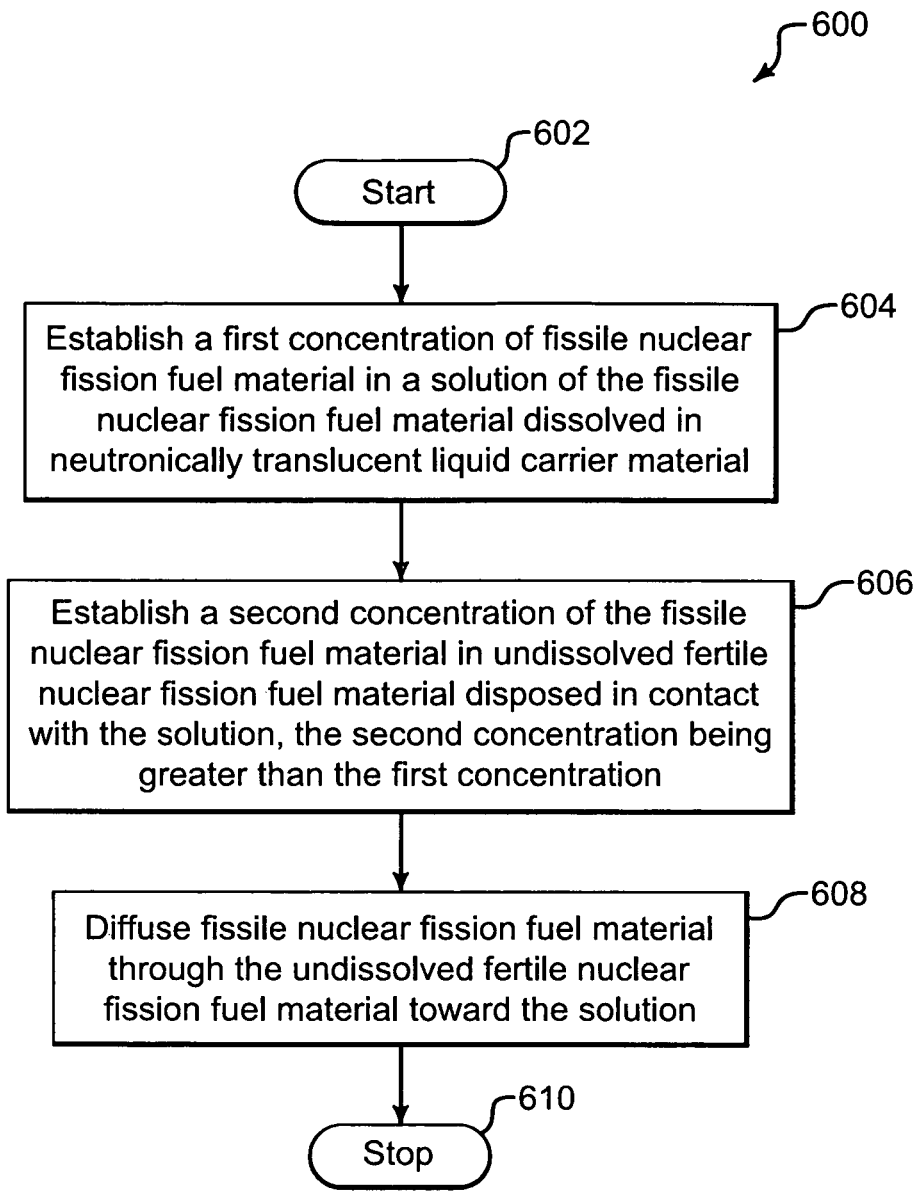
FIG. 6A is a flowchart of an illustrative method of operating a nuclear fission reactor.

Referring now to FIG. 6A, in another illustrative embodiment a method 600 is provided for operating a nuclear fission reactor. The method 600 starts at a block 602. At a block 604 a first concentration is established of fissile nuclear fission fuel material in a solution of the fissile nuclear fission fuel material dissolved in neutronically translucent liquid carrier material. At a block 606 a second concentration is established of the fissile nuclear fission fuel material in undissolved fertile nuclear fission fuel material disposed in contact with the solution, with the second concentration being greater than the first concentration. At a block 608 fissile nuclear fission fuel material is diffused through the undissolved fertile nuclear fission fuel material toward the solution. The method 600 stops at a block 610.

Figure 6B:
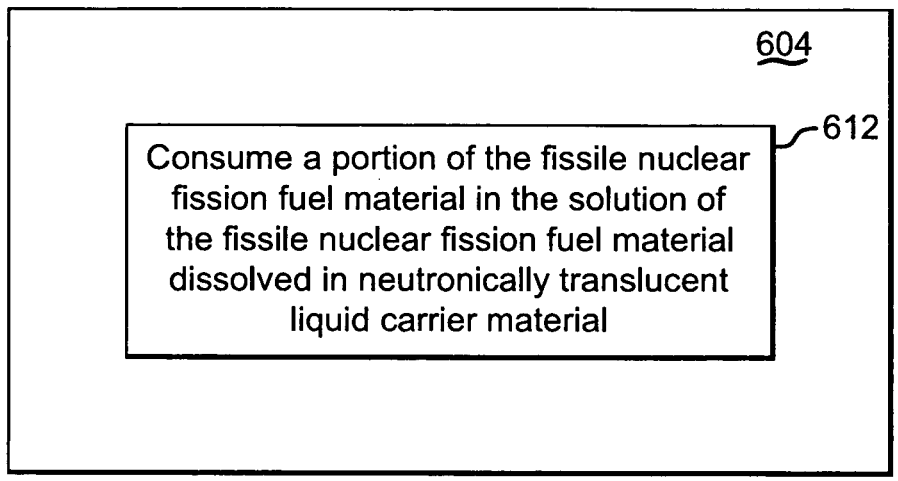
FIGS. 6B-6E are flowcharts of illustrative details of the method of FIG. 6A.
Figure 6C:
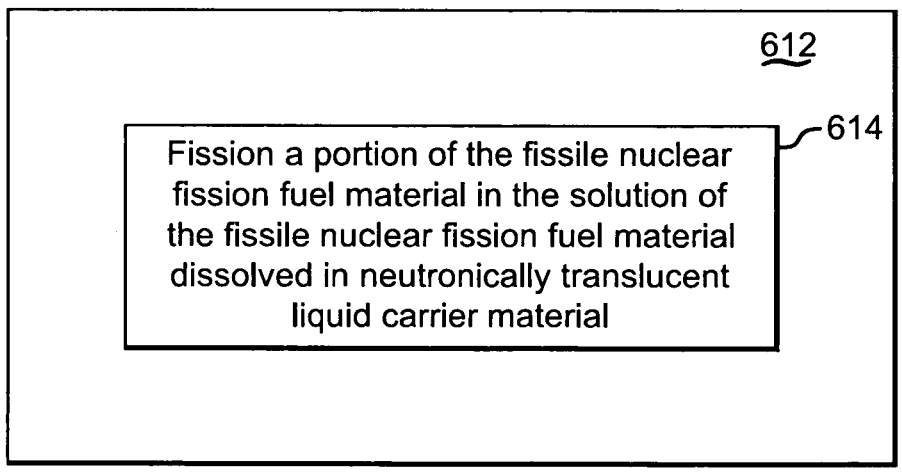

Referring additionally to FIG. 6B, in some embodiments establishing a first concentration of fissile nuclear fission fuel material in a solution of the fissile nuclear fission fuel material dissolved in neutronically translucent liquid carrier material at the block 604 may include consuming a portion of the fissile nuclear fission fuel material in the solution of the fissile nuclear fission fuel material dissolved in neutronically translucent liquid carrier material at a block 612. Referring additionally to FIG. 6C and given by way of non-limiting example, consuming a portion of the fissile nuclear fission fuel material in the solution of the fissile nuclear fission fuel material dissolved in neutronically translucent liquid carrier material at the block 612 may include fissioning a portion of the fissile nuclear fission fuel material in the solution of the fissile nuclear fission fuel material dissolved in neutronically translucent liquid carrier material at a block 614.

Figure 6D:
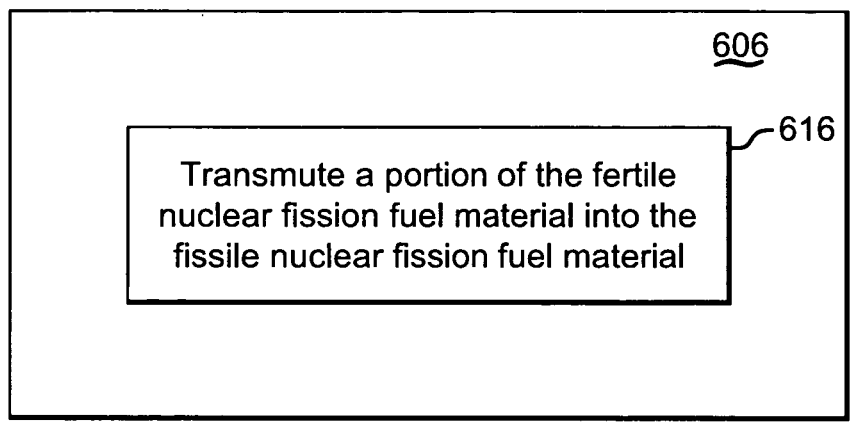

Referring additionally to FIG. 6D, in some embodiments establishing a second concentration of the fissile nuclear fission fuel material in undissolved fertile nuclear fission fuel material disposed in the solution, the second concentration being greater than the first concentration, at the block 606 may include transmuting a portion of the fertile nuclear fission fuel material into the fissile nuclear fission fuel material at a block 616. Given by way of example and not of limitation, in some embodiments as discussed above when $^{238}$U is exposed to a neutron flux, the $^{238}$U will be transmuted to $^{239}$Pu. More particularly, when an atom of $^{238}$U is exposed to a neutron flux, its nucleus will capture a neutron, thereby changing it to $^{239}$U. The $^{239}$U then rapidly undergoes two beta decays. After the $^{238}$U absorbs a neutron to become $^{239}$U it then emits an electron and an anti-neutrino ($\bar{v}_e$) by $\beta^-$ decay to become $^{239}$Np and then emits another electron and anti-neutrino by a second $\beta^-$ decay to become $^{239}$Pu.

Figure 6E:
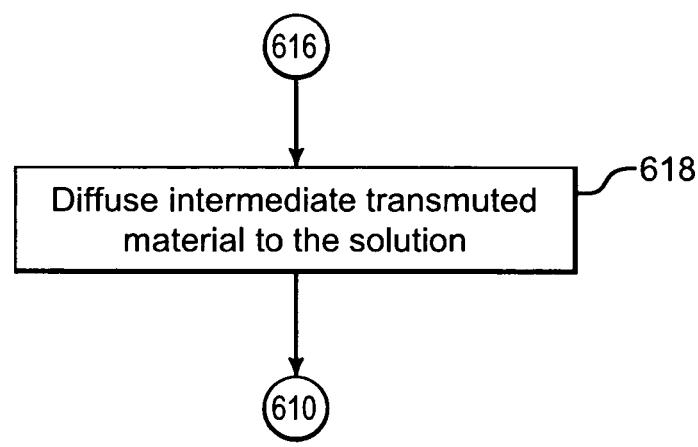

Referring additionally to FIG. 6E, in some embodiments at a block 618 intermediate transmuted material may be diffused to the solution. Given by way of non-limiting examples, as discussed above the intermediate transmuted material may include without limitation $^{239}$U and $^{239}$Np.

Referring now to FIG. 1A, in another embodiment a method 700 is provided for operating a nuclear fission reactor. The method 700 starts at a block 702. At a block 704, in a fission region of a reactor core of a nuclear fission reactor, a portion of fissile nuclear fission fuel material, in a solution of the fissile nuclear fission fuel material dissolved in neutronically translucent liquid carrier material, is fissioned.

At a block 706, in a fertile blanket region of the reactor core, material a portion of undissolved fertile nuclear fission fuel material disposed in contact with the solution is transmuted into the fissile nuclear fission fuel. Given by way of example and not of limitation, in some embodiments as discussed above when $^{238}$U is exposed to a neutron flux (such as may be caused by leakage from the fission region of neutrons from fissioning of the fissile nuclear fission fuel material at the block 704), the $^{238}$U will be transmuted to $^{239}$Pu. More particularly and as discussed above, when an atom of $^{238}$U is exposed to a neutron flux, its nucleus will capture a neutron, thereby changing it to $^{239}$U. The $^{239}$U then rapidly undergoes two beta decays. After the $^{238}$U absorbs a neutron to become $^{239}$U it then emits an electron and an anti-neutrino ($\bar{v}_e$) by $\beta^-$ decay to become $^{239}$Np and then emits another electron and anti-neutrino by a second $\beta^-$ decay to become $^{239}$Pu.

At a block 708 the transmuted fissile nuclear fission fuel is diffused. The method 700 stops at a block 710.

Figure 7A:
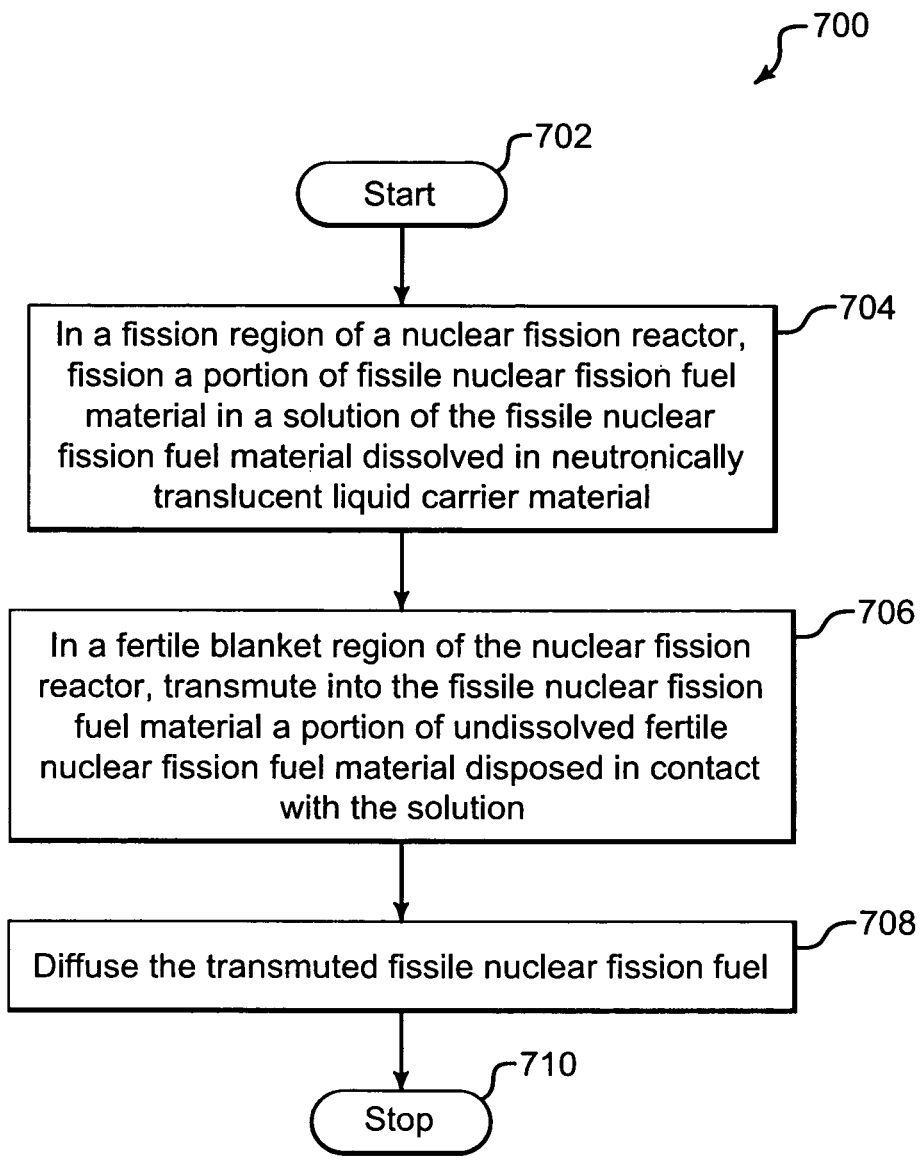
FIG. 7A is a flowchart of an illustrative method of operating a nuclear fission reactor.
Figure 7B:
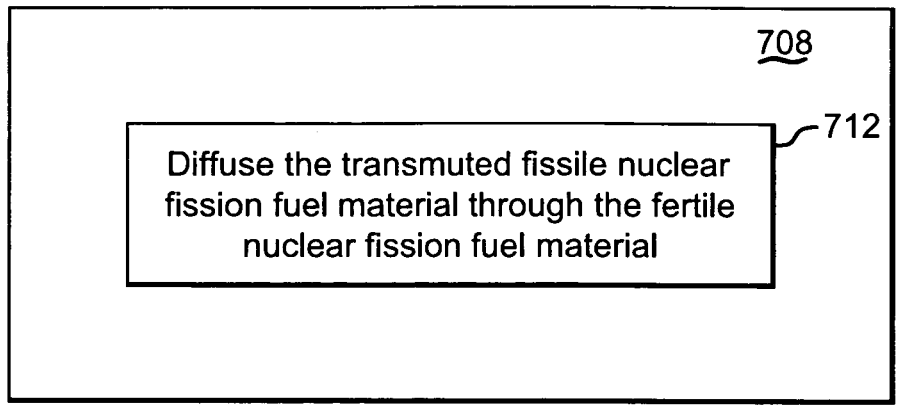
FIGS. 7B-7G are flowcharts of illustrative details of the method of FIG. 7A.
Figure 7C:
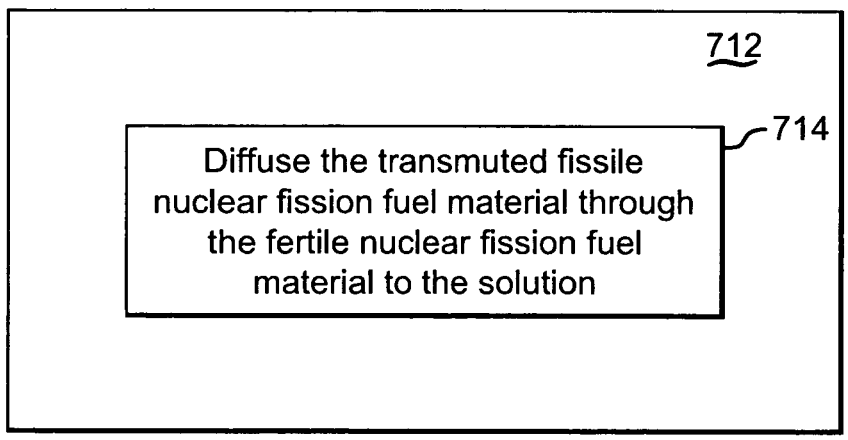

Referring additionally to FIG. 7B, diffusing the transmuted fissile nuclear fission fuel material at the block 708 may include diffusing the transmuted fissile nuclear fission fuel material through the fertile nuclear fission fuel material at a block 712. For example and referring additionally to FIG. 7C, diffusing the transmuted fissile nuclear fission fuel material through the fertile nuclear fission fuel material at the block 714 may include diffusing the transmuted fissile nuclear fission fuel material through the fertile nuclear fission fuel material to the solution at a block 714.

Figure 7D:
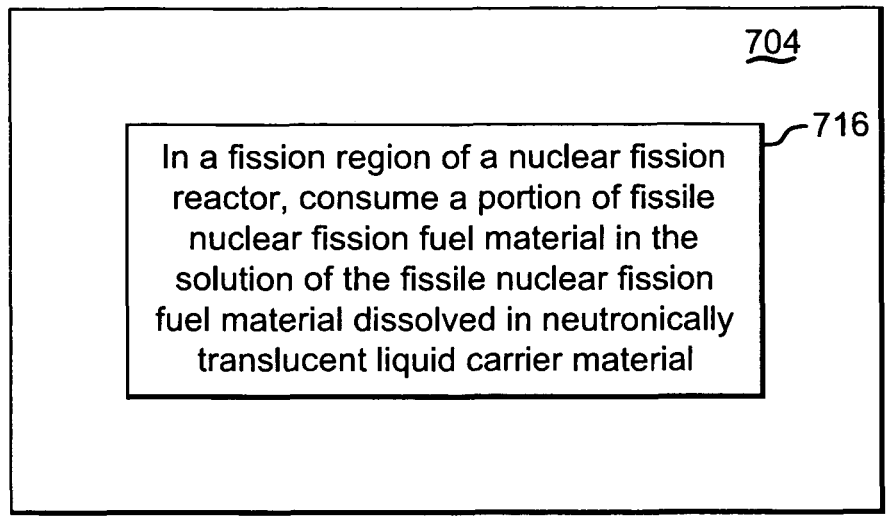

Referring now to FIGS. 7A and 7D, in some embodiments, in a fission region of a reactor core of a nuclear fission reactor, fissioning a portion of fissile nuclear fission fuel material in a solution of the fissile nuclear fission fuel material dissolved in neutronically translucent liquid carrier material at the block 704 may include, in a fission region of a reactor core of a nuclear fission reactor, consuming a portion of fissile nuclear fission fuel material in the solution of the fissile nuclear fission fuel material dissolved in neutronically translucent liquid carrier material at a block 716.

Figure 7E:
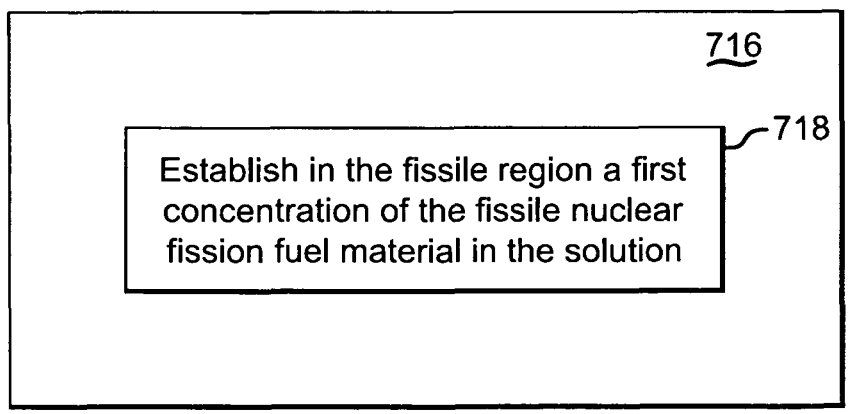

Referring additionally to FIG. 7E, it will be appreciated that, in a fission region of a reactor core of a nuclear fission reactor, consuming a portion of fissile nuclear fission fuel material in the solution of the fissile nuclear fission fuel material dissolved in neutronically translucent liquid carrier material at the block 716 may include establishing in the fissile region a first concentration of the fissile nuclear fission fuel material in the solution at a block 718.

Figure 7F:
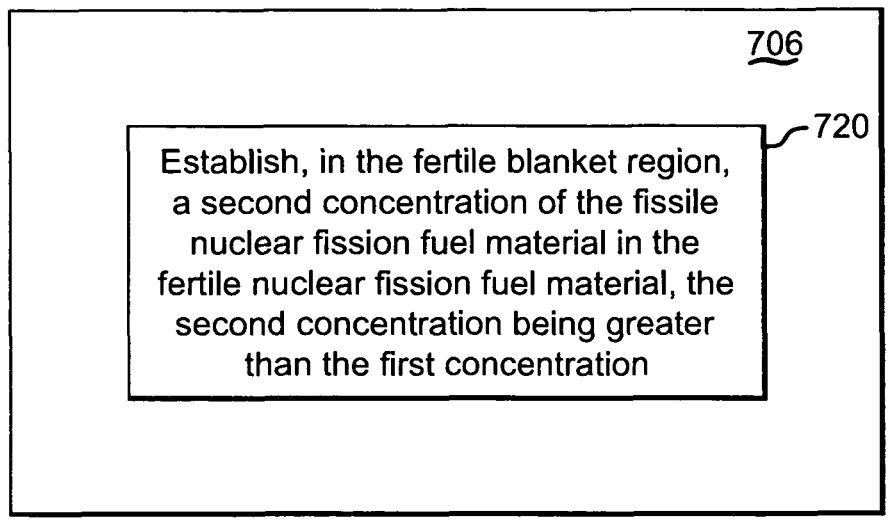

Referring additionally to FIG. 7F, it will also be appreciated that, in a fertile blanket region of the reactor core, transmuting into the fissile nuclear fission fuel material a portion of undissolved fertile nuclear fission fuel material disposed in the solution at the block 706 may include establishing, in the fertile blanket region, a second concentration of the fissile nuclear fission fuel material in the fertile nuclear fission fuel material, the second concentration being greater than the first concentration at a block 720.

Figure 7G:
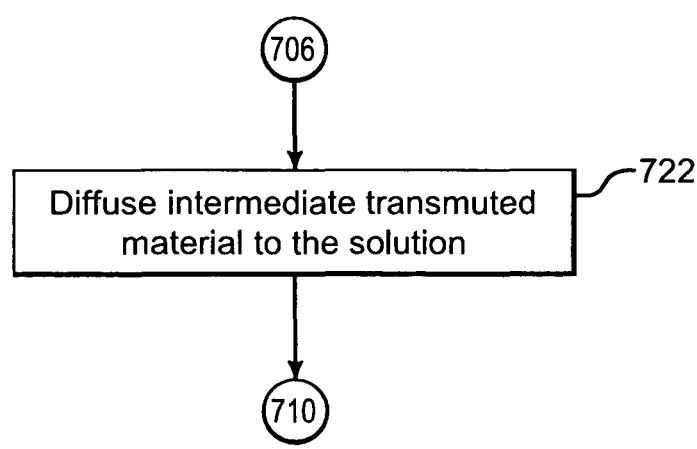

Referring additionally to FIG. 7G, in some embodiments at a block 722 intermediate transmuted material may be diffused to the solution. Given by way of non-limiting examples, as discussed above the intermediate transmuted material may include without limitation $^{239}$U and $^{239}$Np.

It will be appreciated that blocks of the methods 500 (FIGS. 5A-5D), 600 (FIGS. 6A-6E), and 700 (FIGS. 7A-7G) may occur in any suitable host environment. Given by way of non-limiting examples, the blocks may occur in any suitable reactor vessel, such as without limitation reactor vessels described above. In some embodiments, the blocks may occur in suitable nuclear fission fuel pins, such as without limitation nuclear fission fuel pins described above.

Figure 8A:
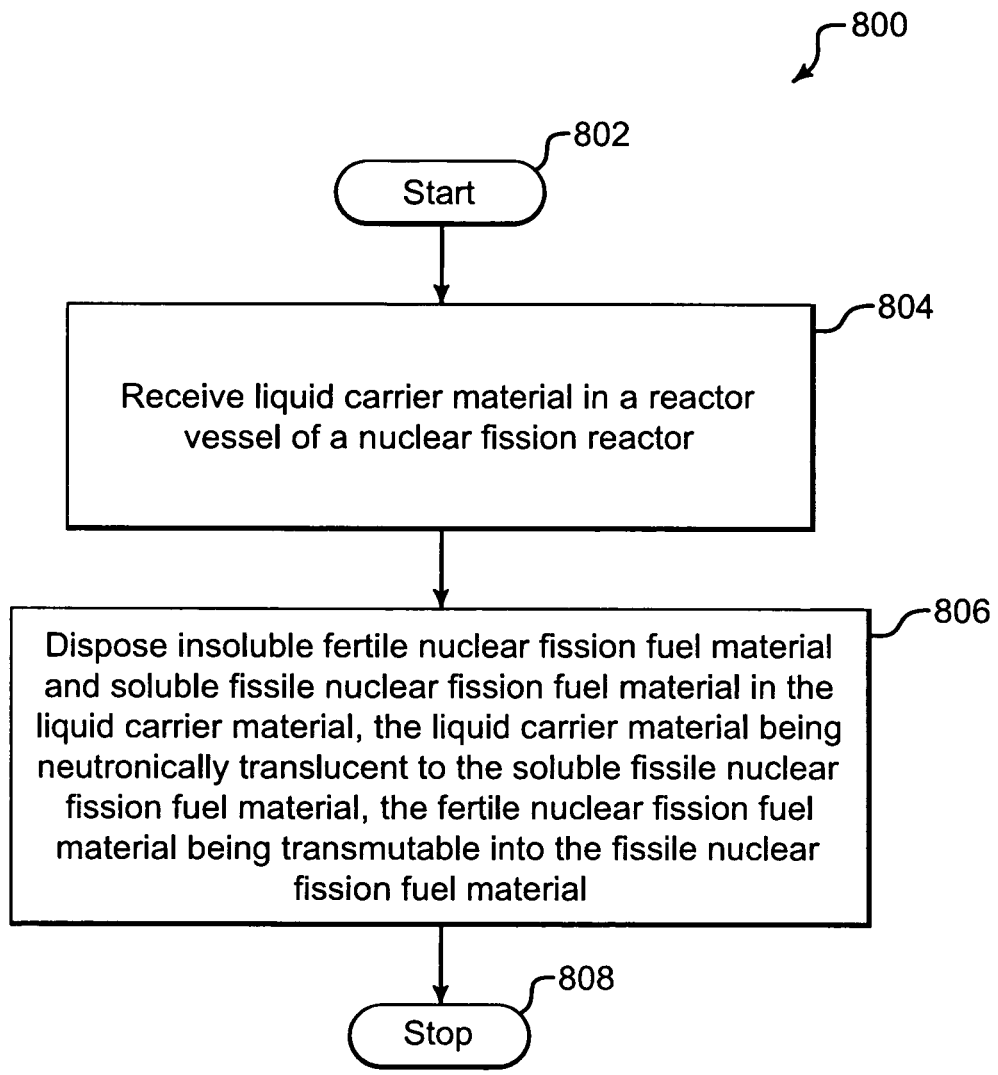
FIG. 8A is a flowchart of an illustrative method of fueling a nuclear fission reactor.

Referring now to FIG. 8A, in an embodiment an illustrative method 800 is provided for fueling a nuclear fission reactor. The method 800 starts at a block 802. At a block 804 liquid carrier material is received in a reactor core of a nuclear fission reactor. At a block 806 insoluble fertile nuclear fission fuel material and soluble fissile nuclear fission fuel material are disposed in the liquid carrier material. The liquid carrier material is neutronically translucent to the soluble fissile nuclear fission fuel material, and the fertile nuclear fission fuel material is transmutable into the fissile nuclear fission fuel material. The method 800 stops at a block 808.

Figure 8B:
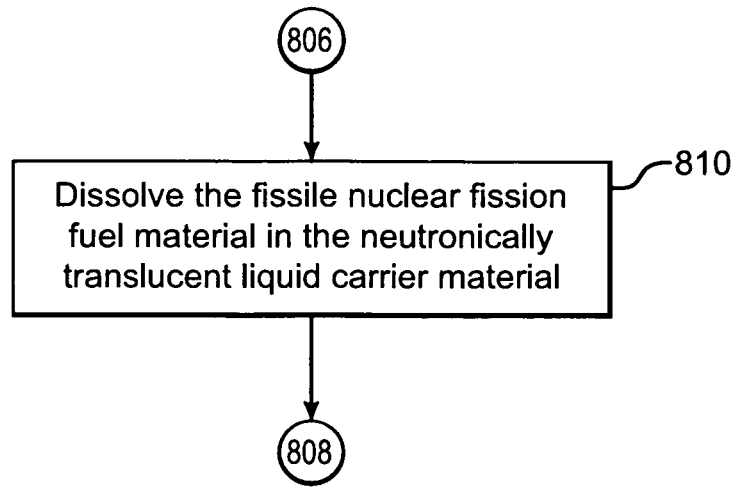

Referring additionally to FIG. 8B, in some embodiments the fissile nuclear fission fuel material may be dissolved in the neutronically translucent liquid carrier material at a block 810.

Figure 8C:
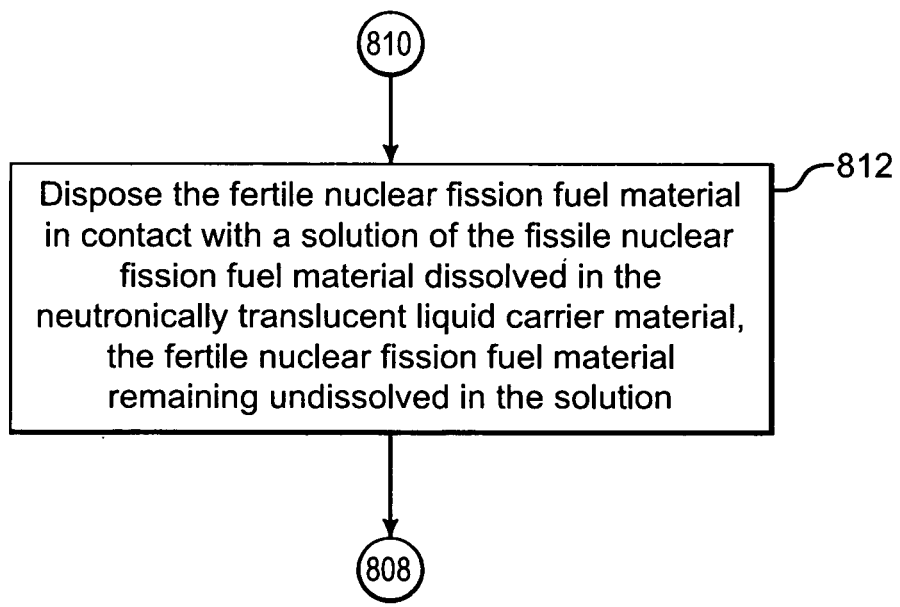

Referring additionally to FIG. 8C, at a block 812 the fertile nuclear fission fuel material may be disposed in contact with a solution of the fissile nuclear fission fuel material dissolved in the neutronically translucent liquid carrier material, the fertile nuclear fission fuel material remaining undissolved in the solution.

Figure 8D:
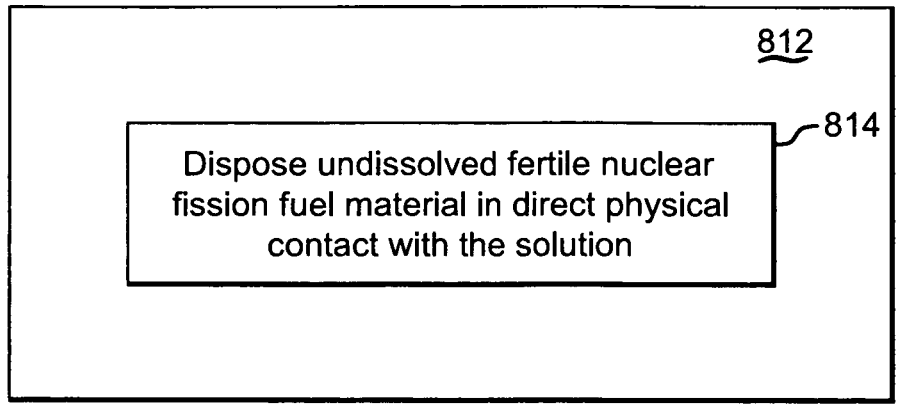
Figure 8E:
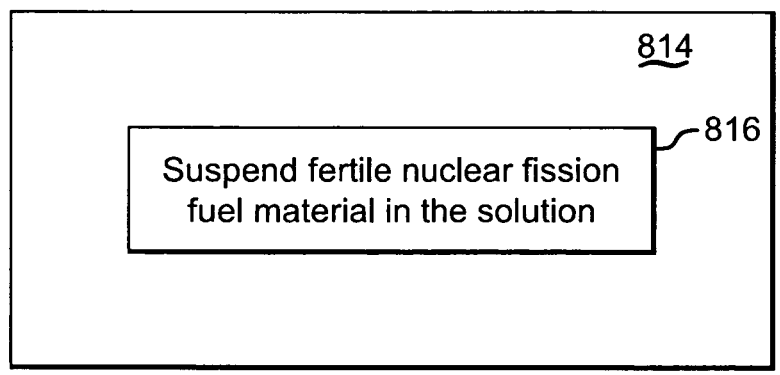

Referring additionally to FIG. 8D, in some embodiments disposing the fertile nuclear fission fuel material in contact with a solution of the fissile nuclear fission fuel material dissolved in the neutronically translucent liquid carrier material, the fertile nuclear fission fuel material remaining undissolved in the solution, at the block 812 may include disposing undissolved fertile nuclear fission fuel material in direct physical contact with the solution at a block 814. For example and referring additionally to FIG. 8E, in some embodiments disposing the fertile nuclear fission fuel material in direct physical contact with a solution of the fissile nuclear fission fuel material dissolved in the neutronically translucent liquid carrier material, the fertile nuclear fission fuel material remaining undissolved in the solution, at the block 814 may include suspending fertile nuclear fission fuel material in the solution at a block 816.

Referring additionally to FIG. 8F, in some embodiments disposing the fertile nuclear fission fuel material in contact with a solution of the fissile nuclear fission fuel material dissolved in the neutronically translucent liquid carrier material, the fertile nuclear fission fuel material remaining undissolved in the solution, at the block 812 may include disposing, homogeneously in the reactor core, fertile nuclear fission fuel material in contact with a solution of the fissile nuclear fission fuel material dissolved in the neutronically translucent liquid carrier material, the fertile nuclear fission fuel material remaining undissolved in the solution, at a block 818.

In some other embodiments and referring additionally to FIG. 8G, disposing the fertile nuclear fission fuel material in contact with a solution of the fissile nuclear fission fuel material dissolved in the neutronically translucent liquid carrier material, the fertile nuclear fission fuel material remaining undissolved in the solution, at the block 812 may include disposing, heterogeneously in the reactor core, the fertile nuclear fission fuel material in contact with a solution of the fissile nuclear fission fuel material dissolved in the neutronically translucent liquid carrier material, the fertile nuclear fission fuel material remaining undissolved in the solution, at a block 820.

Figure 8H:
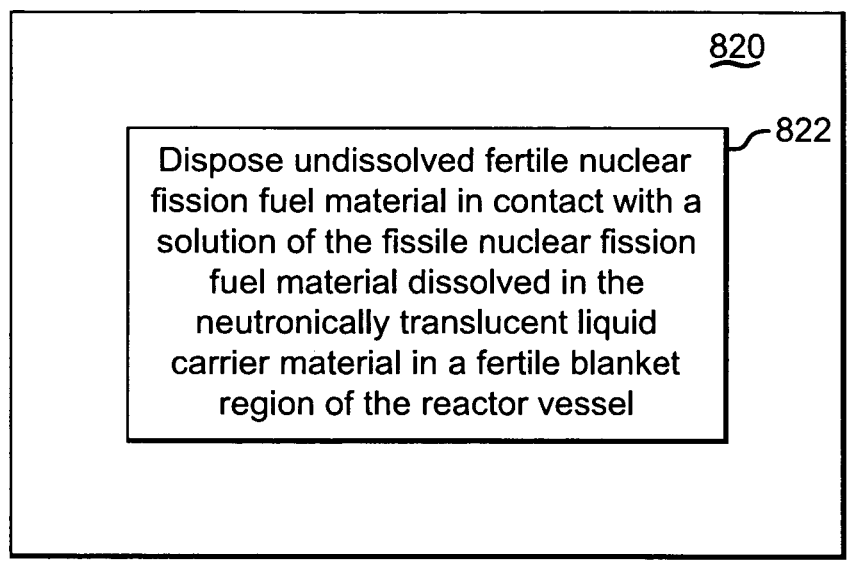

Given by way of non-limiting example and referring additionally to FIG. 8H, in some embodiments disposing, heterogeneously in the reactor core, the fertile nuclear fission fuel material in contact with a solution of the fissile nuclear fission fuel material dissolved in the neutronically translucent liquid carrier material, the fertile nuclear fission fuel material remaining undissolved in the solution, at the block 820 may include disposing undissolved fertile nuclear fission fuel material in contact with a solution of the fissile nuclear fission fuel material dissolved in the neutronically translucent liquid carrier material in a fertile blanket region of the reactor core at a block 822.

Figure 9A:
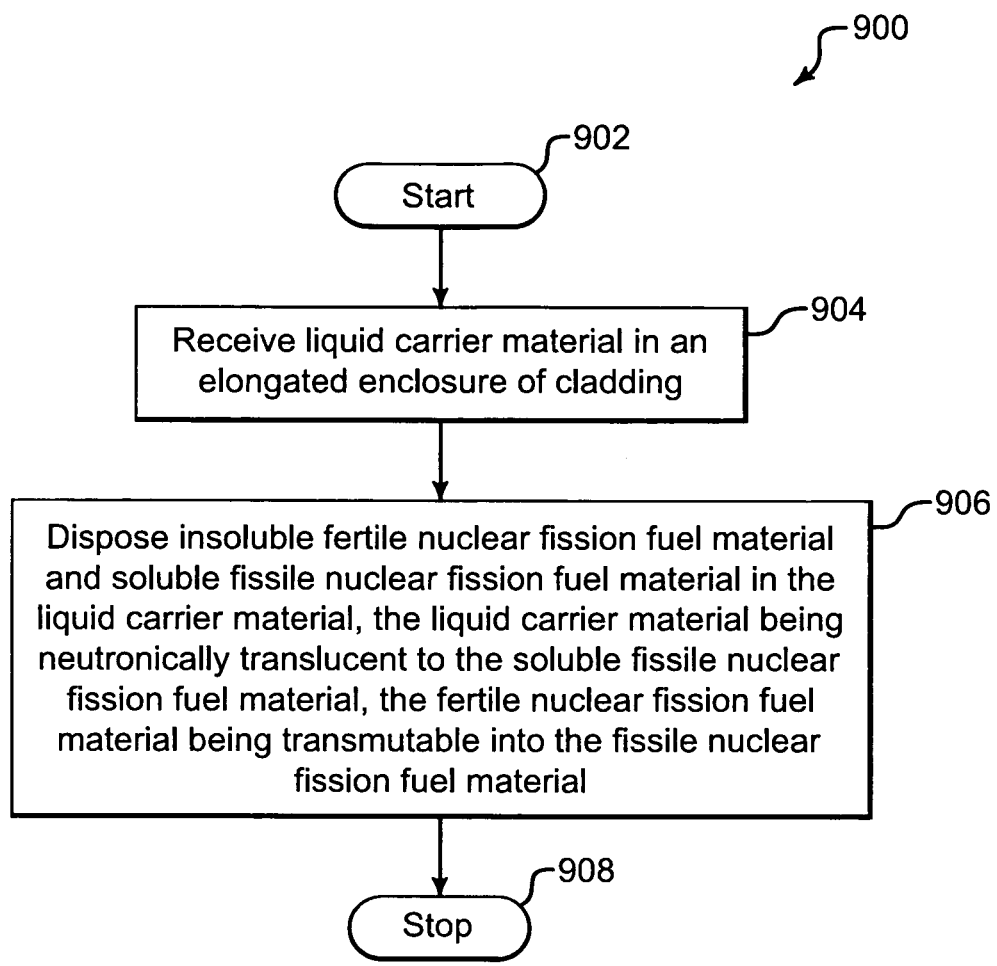
FIG. 9A is a flowchart of an illustrative method of fabricating a nuclear fission fuel pin.

In another embodiment and referring now to FIG. 9A, an illustrative method 900 is provided for fabricating a nuclear fission fuel pin. The method 900 starts at a block 902. At a block 904 liquid carrier material is received in an elongated enclosure of cladding. At a block 906 insoluble fertile nuclear fission fuel material and soluble fissile nuclear fission fuel material are disposed in the liquid carrier material. The liquid carrier material is neutronically translucent to the soluble fissile nuclear fission fuel material, and the fertile nuclear fission fuel material is transmutable into the fissile nuclear fission fuel material. The method 900 stops at a block 908.

Figure 9B:
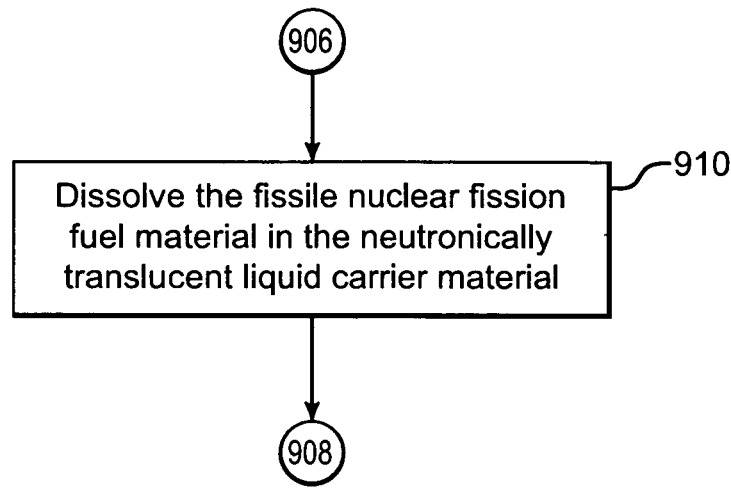
FIGS. 9B-9J are flowcharts of illustrative details of the method of FIG. 9A.

Referring additionally to FIG. 9B, in some embodiments at a block 910 the fissile nuclear fission fuel material may be dissolved in the neutronically translucent liquid carrier material.

Figure 9C:
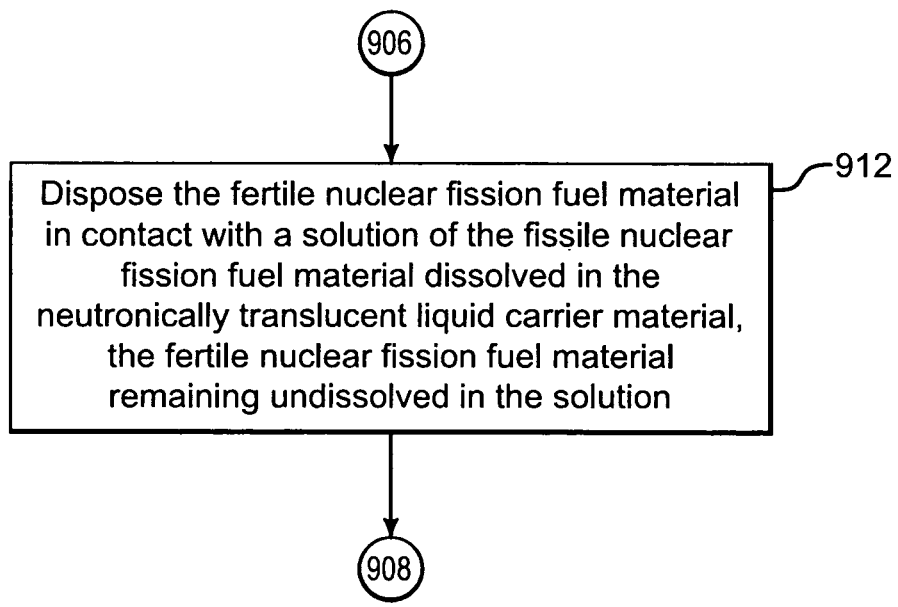

Referring additionally to FIG. 9C, in some embodiments at, a block 912 the fertile nuclear fission fuel material may be disposed in contact with a solution of the fissile nuclear fission fuel material dissolved in the neutronically translucent liquid carrier material, the fertile nuclear fission fuel material remaining undissolved in the solution.

Figure 9D:
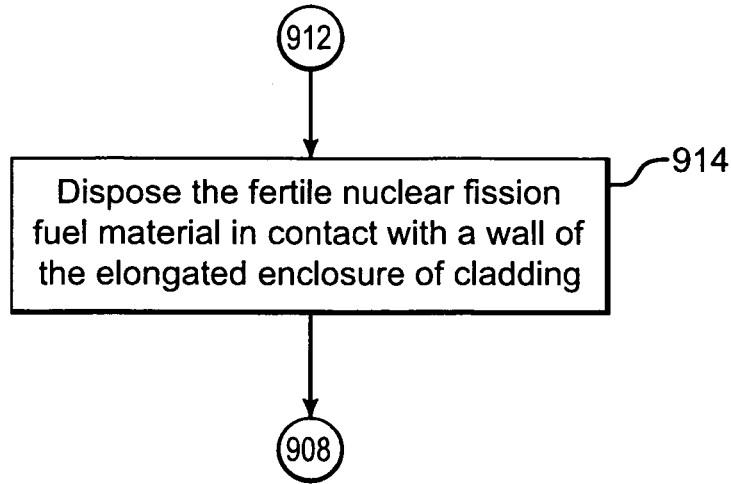
Figure 9E:
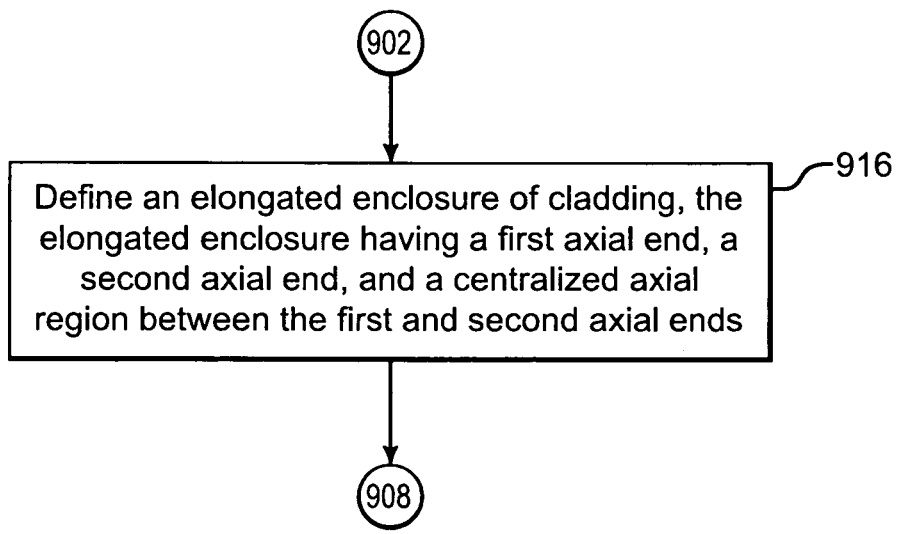

Referring additionally to FIG. 9D, in some embodiments the fertile nuclear fission fuel material may be disposed in contact with a wall of the elongated enclosure of cladding at a block 914.

Referring, now to FIGS. 9A-9C and 9E, in some embodiments at a block 916 an elongated enclosure of cladding may be defined, the elongated enclosure having a first axial end, a second axial end, and a centralized axial region between the first and second axial ends.

Figure 9F:
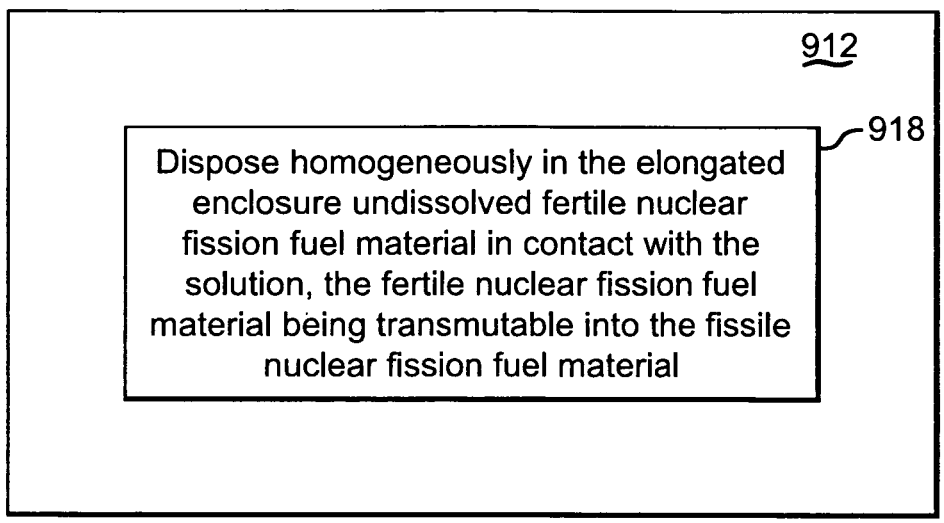
Figure 9G:
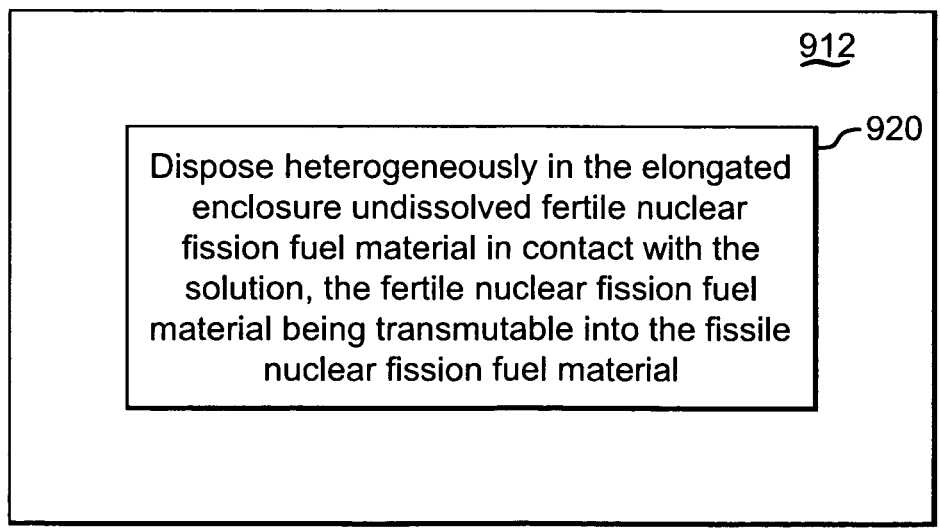

Referring additionally to FIG. 9F, in some embodiments disposing in the elongated enclosure undissolved fertile nuclear fission fuel material in contact with the solution, the fertile nuclear fission fuel material being transmutable into the fissile nuclear fission fuel material, at the block 912 may includes disposing homogeneously in the elongated enclosure undissolved fertile nuclear fission fuel material in contact with the solution, the fertile nuclear fission fuel material being transmutable into the fissile nuclear fission fuel material, at a block 918.

In some other embodiments and referring now to FIGS. 9A-9C, 9E, and 9G, disposing in the elongated enclosure undissolved fertile nuclear fission fuel material in contact with the solution, the fertile nuclear fission fuel material being transmutable into the fissile nuclear fission fuel material, at the block 912 may include disposing heterogeneously in the elongated enclosure undissolved fertile nuclear fission fuel material in contact with the solution, the fertile nuclear fission fuel material being transmutable into the fissile nuclear fission fuel material, at a block 920.

Figure 9H:
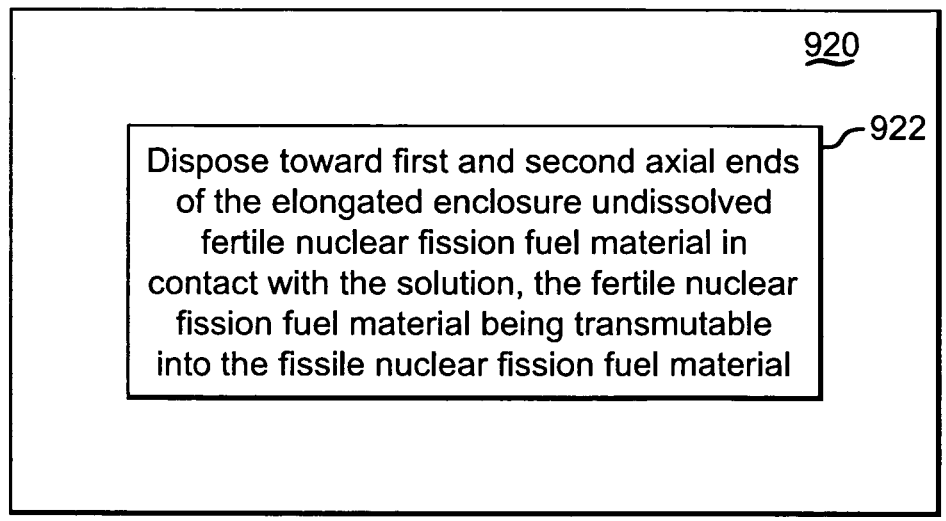

For example and referring additionally to FIG. 9H, in some embodiments disposing heterogeneously in the elongated enclosure undissolved fertile nuclear fission fuel material in contact the solution, the fertile nuclear fission fuel material being transmutable into the fissile nuclear fission fuel material, at the block 920 may include, at a block 922, disposing toward first and second axial ends of the elongated enclosure undissolved fertile nuclear fission fuel material in contact with the solution, the fertile nuclear fission fuel material being transmutable into the fissile nuclear fission fuel material.

Figure 9I:
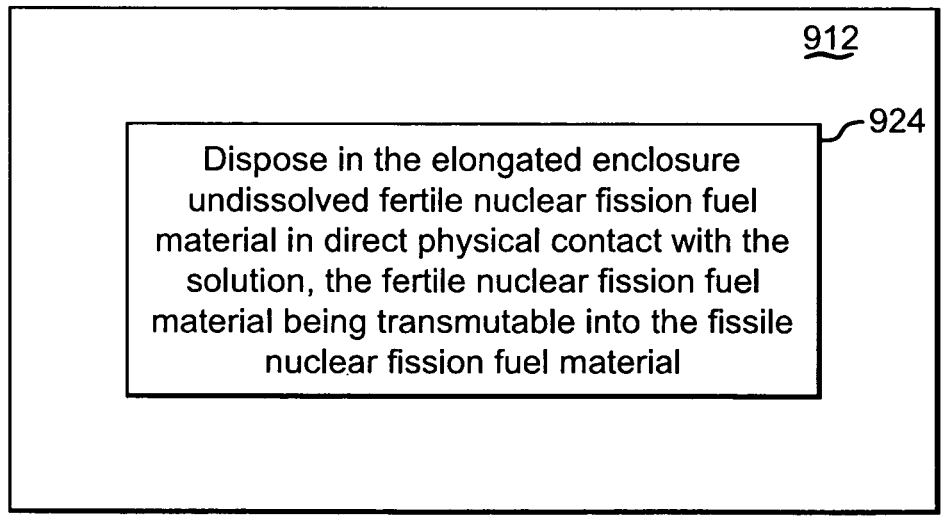
Figure 9J:
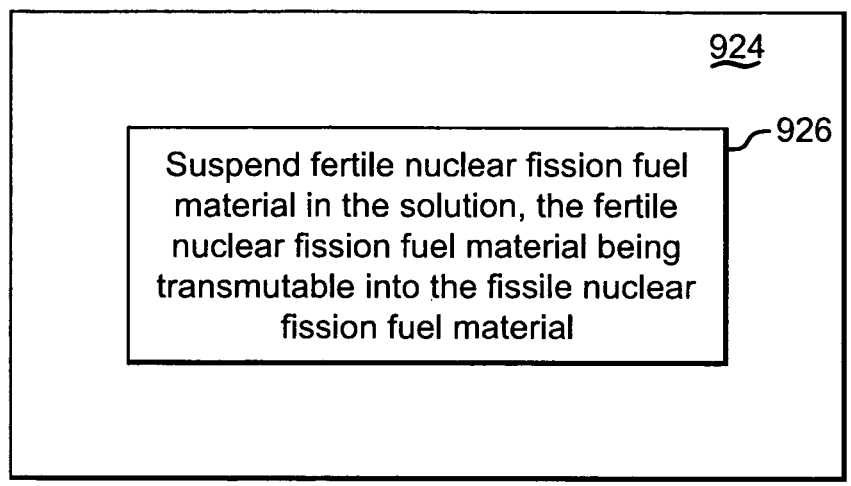

Referring additionally to FIG. 9I, in some embodiments disposing in the elongated enclosure undissolved fertile nuclear fission fuel material in contact with the solution, the fertile nuclear fission fuel material being transmutable into the fissile nuclear fission fuel material, at the block 912 may include disposing in the elongated enclosure undissolved fertile nuclear fission fuel material in direct physical contact with the solution, the fertile nuclear fission fuel material being, transmutable into the fissile nuclear fission fuel material, at a block 924. Given by way of non-limiting example and referring additionally to FIG. 9J, in some embodiments disposing in the elongated enclosure undissolved fertile nuclear fission fuel material in direct physical contact with the solution, the fertile nuclear fission fuel material being transmutable into the fissile nuclear fission fuel material, at the block 924 may include suspending fertile nuclear fission fuel material in the solution, the fertile nuclear fission fuel material being transmutable into the fissile nuclear fission fuel material, at a block 926.

Figure 10A:
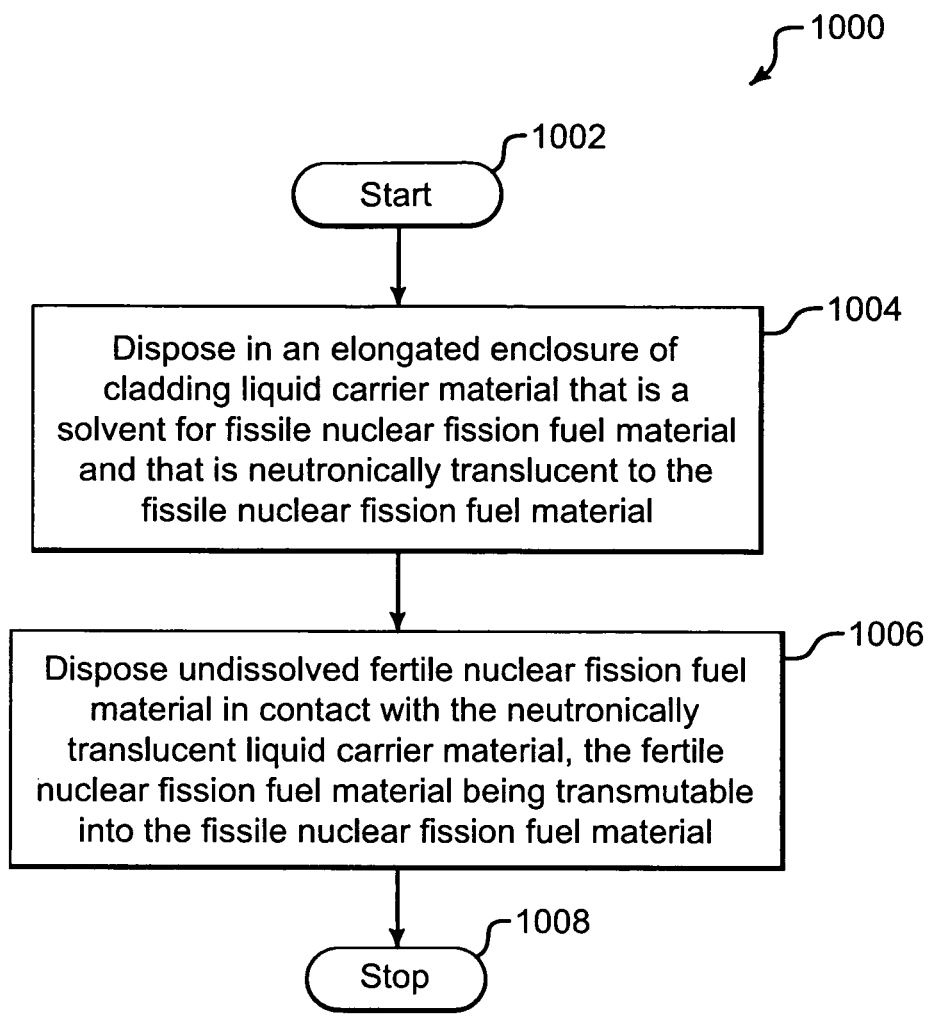
FIG. 10A is a flowchart of an illustrative method of fabricating a nuclear fission fuel pin.

Referring now to FIG. 10A, in another embodiment an illustrative method 1000 is provided for fabricating a nuclear fission fuel pin. The method 1000 starts at a block 1002. At a block 1004 liquid carrier material that is a solvent for fissile nuclear fission fuel material and that is neutronically translucent to the fissile nuclear fission fuel material is disposed in an elongated enclosure of cladding. At a block 1006 undissolved fertile nuclear fission fuel material is disposed in contact with the neutronically translucent liquid carrier material, the fertile nuclear fission fuel material being transmutable into the fissile nuclear fission fuel material. The method 1000 stops at a block 1008.

Figure 10B:
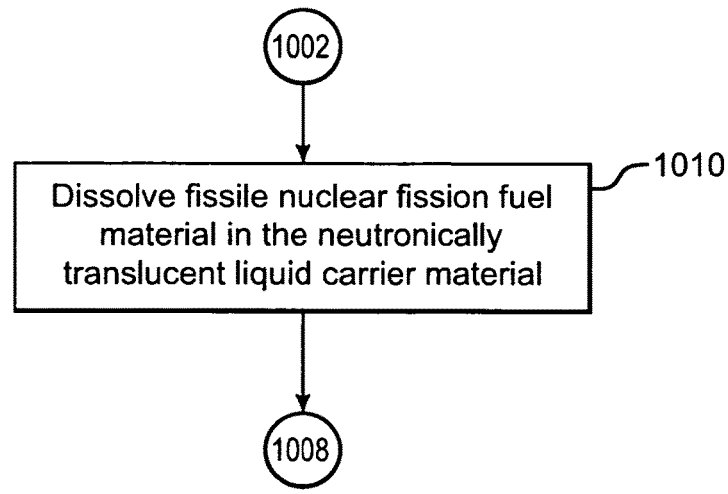
FIGS. 10B-10I are flowcharts of illustrative details of the method of FIG. 10A.

Referring additionally to FIG. 10B, in some embodiments fissile nuclear fission fuel material may be dissolved in the neutronically translucent liquid carrier material at a block 1010.

Figure 10C:
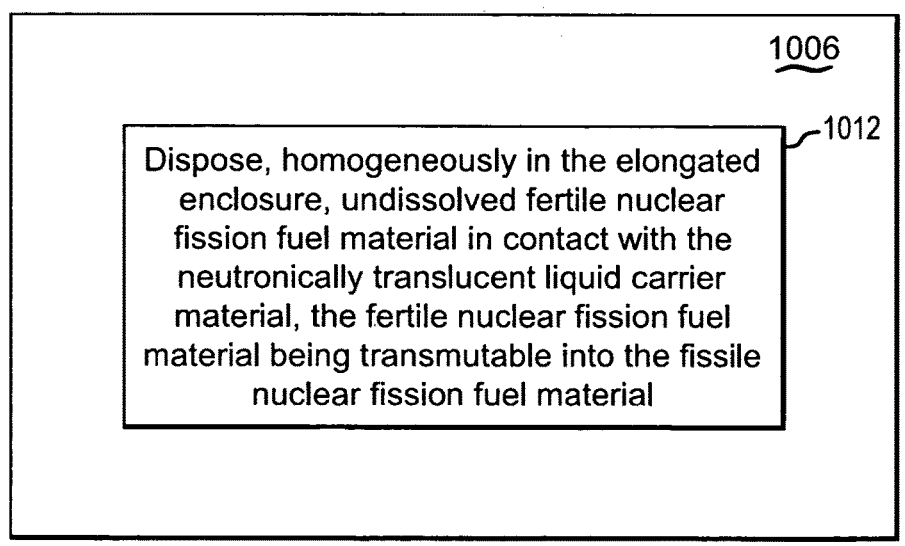

Referring additionally to FIG. 10C, in some embodiments disposing undissolved fertile nuclear fission fuel material in contact with the neutronically translucent liquid carrier material, the fertile nuclear fission fuel material being transmutable into the fissile nuclear fission fuel material, at the block 1006 may include disposing, homogeneously in the elongated enclosure, undissolved fertile nuclear fission fuel material in contact with the neutronically translucent liquid carrier material, the fertile nuclear fission fuel material being transmutable into the fissile nuclear fission fuel material, at a block 1012.

Figure 10D:
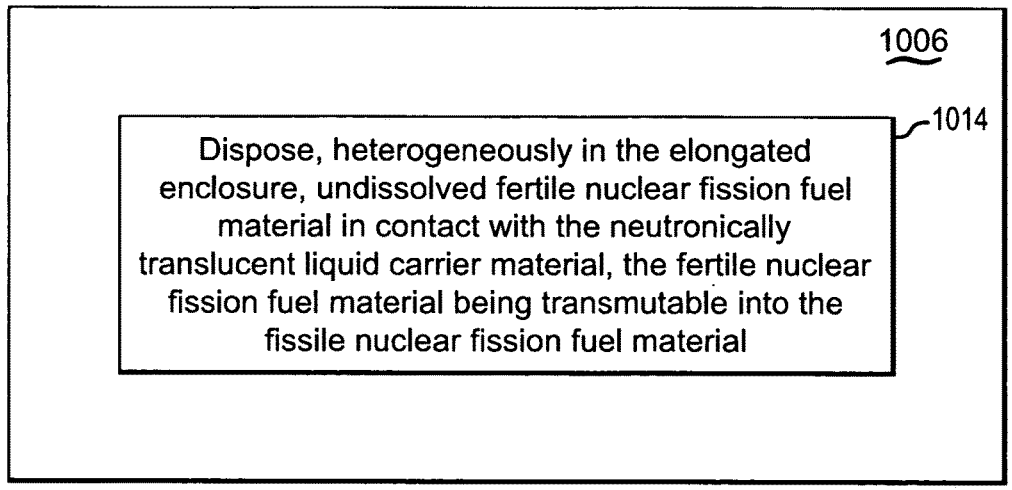

In some other embodiments and referring to FIGS. 10A, 10B and 10D, disposing undissolved fertile nuclear fission fuel material in contact with the neutronically translucent liquid carrier material, the fertile nuclear fission fuel material being transmutable into the fissile nuclear fission fuel material, at the block 1006 may include disposing, heterogeneously in the elongated enclosure, undissolved fertile nuclear fission fuel material in contact with the neutronically translucent liquid carrier material, the fertile nuclear fission fuel material being transmutable into the fissile nuclear fission fuel material, at a block 1014.

Figure 10E:
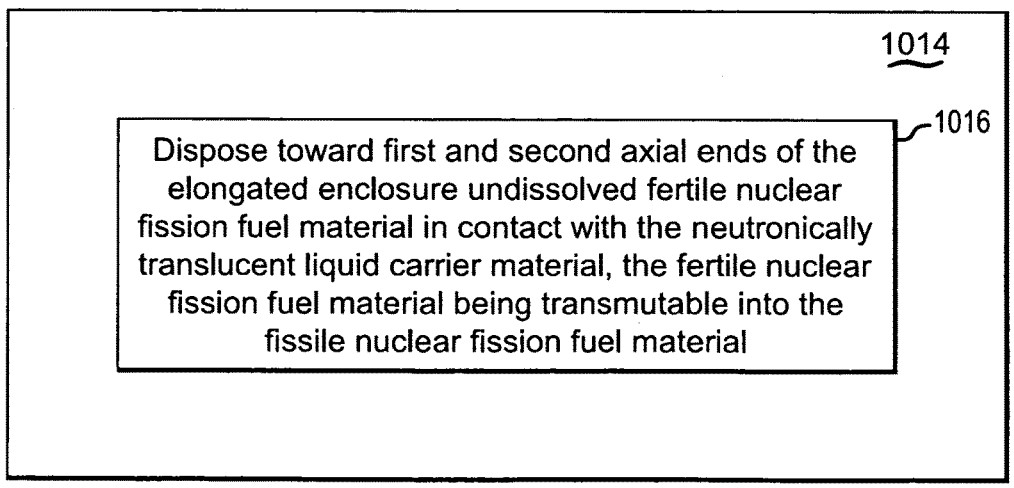

Given by way of non-limiting example and referring additionally to FIG. 10E, in some embodiments disposing, heterogeneously in the elongated enclosure, undissolved fertile nuclear fission fuel material in contact with the neutronically translucent liquid carrier material, the fertile nuclear fission fuel material being transmutable into the fissile nuclear fission fuel material, at the block 1014 may include disposing toward first and second axial ends of the elongated enclosure undissolved fertile nuclear fission fuel material in contact with the neutronically translucent liquid carrier material, the fertile nuclear fission fuel material being transmutable into the fissile nuclear fission fuel material, at a block 1016.

Figure 10F:
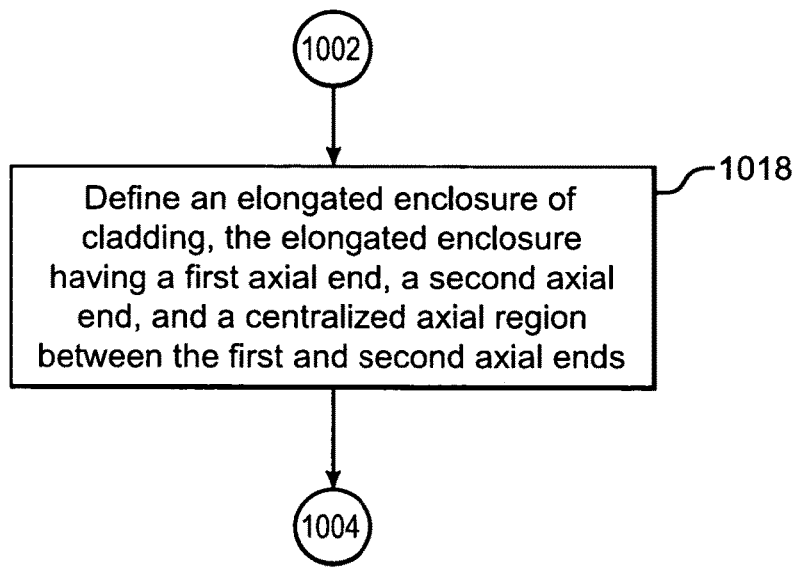

Referring additionally to FIG. 10F, in some embodiments at a block 1018 an elongated enclosure of cladding may be defined, the elongated enclosure having a first axial end, a second axial end, and a centralized axial region between the first and second axial ends.

Figure 10G:
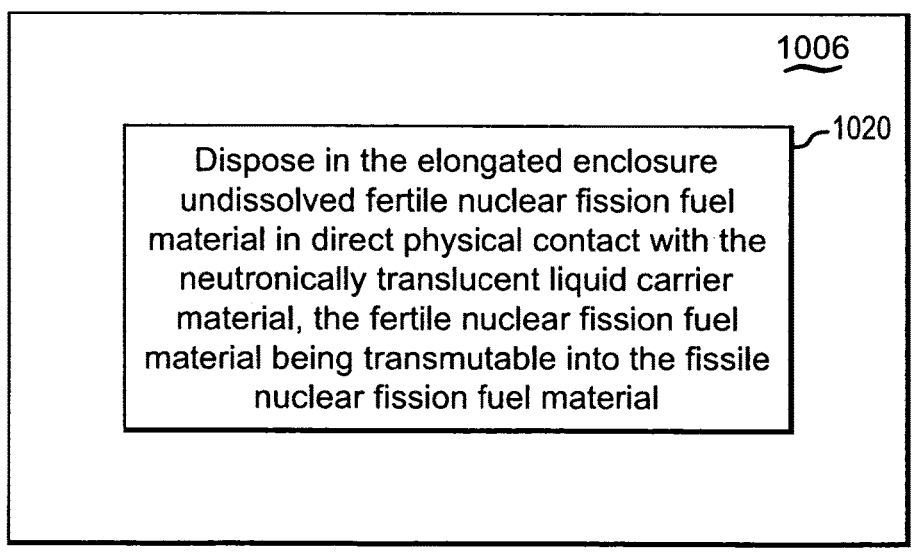
Figure 10H:
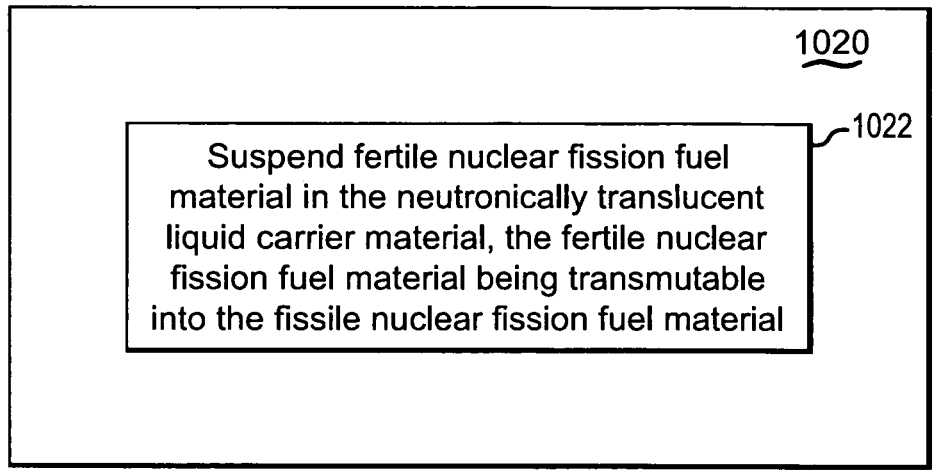

Referring additionally to FIG. 10G, in some embodiments disposing undissolved fertile nuclear fission fuel material in contact with the neutronically translucent liquid carrier material, the fertile nuclear fission fuel material being transmutable into the fissile nuclear fission fuel material, at the block 1006 may include disposing in the elongated enclosure undissolved fertile nuclear fission fuel material in direct physical contact with the neutronically translucent liquid carrier material, the fertile nuclear fission fuel material being transmutable into the fissile nuclear fission fuel material at a block 1020. For example and referring additionally to FIG. 10H, in some embodiments disposing undissolved fertile nuclear fission fuel material in direct physical contact with the neutronically translucent liquid carrier material, the fertile nuclear fission fuel material being transmutable into the fissile nuclear fission fuel material, at the block 1020 may includes suspending fertile nuclear fission fuel material in the neutronically translucent liquid carrier material, the fertile nuclear fission fuel material being transmutable into the fissile nuclear fission fuel material, at a block 1022.

Figure 10I:
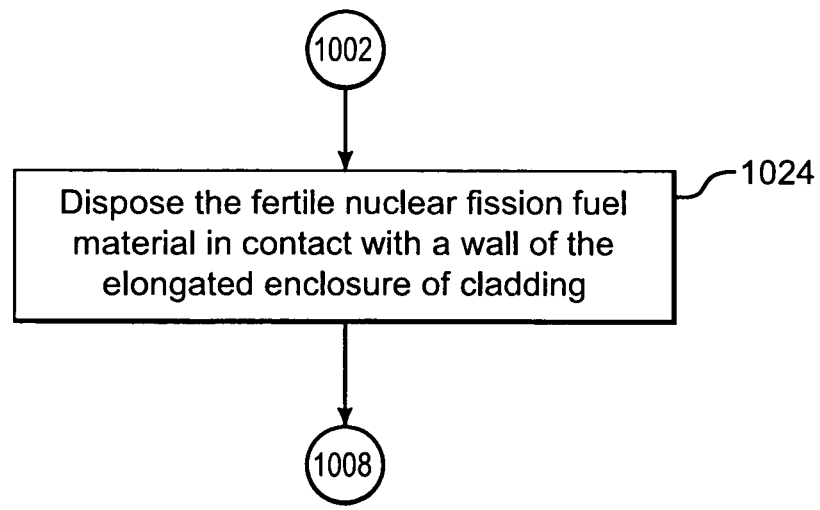

Referring now to FIGS. 10A and 10I, in some embodiments the fertile nuclear fission fuel material may be disposed in contact with a wall of the elongated enclosure of cladding at a block 1024.

Those skilled in the art will appreciate that the foregoing specific illustrative processes and/or devices and/or technologies are representative of more general processes and/or devices and/or technologies taught elsewhere herein, such as in the claims filed herewith and/or elsewhere in the present application.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality.

In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting and/or logically interactable components.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operating a nuclear fission reactor, the method comprising:
    providing a nuclear fission reactor having a reactor vessel, the reactor vessel having a fission region and a fertile blanket region, wherein the fission region is separate from and interior to the fertile blanket region, and the fertile blanket region is between the fission region and a wall of the reactor vessel;
    receiving a solution in the fission region and the fertile blanket region of the reactor vessel of the nuclear fission reactor, the solution including a neutronically translucent liquid carrier material and a first fissile nuclear fission fuel material, the first fissile nuclear fission fuel material being dissolved in the neutronically translucent liquid carrier material;
    disposing an undissolved fertile nuclear fission fuel material in a foam form in the fertile blanket region of the reactor vessel and in direct physical contact with the solution;
    exposing the undissolved fertile fission fuel material to a neutron flux of the nuclear fission reactor to transmute a portion of the undissolved fertile nuclear fission fuel material into a second fissile nuclear fission fuel material;
    diffusing the second fissile nuclear fission fuel material to the solution; and
    receiving the solution in the fission region and the fertile blanket region of the reactor vessel of the nuclear fission reactor, the solution including the neutronically translucent liquid carrier material, the first fissile nuclear fission fuel material, and the second fissile nuclear fission fuel material, the first and second fissile nuclear fission fuel materials being dissolved in the neutronically translucent liquid carrier material.

2. The method of claim 1, further comprising: diffusing intermediate transmuted material to the solution.

3. The method of claim 1, further comprising:
    fissioning a portion of the second fissile nuclear fission fuel material.

4. The method of claim 1, wherein diffusing the second fissile nuclear fission fuel material to the solution includes diffusing the second fissile nuclear fission fuel material through the undissolved fertile nuclear fission fuel material.

5. The method of claim 1, wherein disposing the undissolved fertile nuclear fission fuel material in the fertile blanket region includes disposing the undissolved fertile nuclear fission fuel material in the fertile blanket region and not in the fission region.

6. The method of claim 1, wherein providing the nuclear fission reactor having a reactor vessel, the reactor vessel having the fission region and the fertile blanket region, includes providing the reactor vessel with the fission region in fluid communication with the fertile blanket region.

7. The method of claim 1, further comprising, fissioning the second fissile nuclear fuel material to generate a neutron flux, exposing another portion of the undissolved fertile nuclear fission fuel material to the neutron flux of the second fissile nuclear fuel material to transmute the another portion of the undissolved fertile nuclear fission fuel material into additional second fissile nuclear fission fuel material, and diffusing the additional second fissile nuclear fission fuel material to the solution.

8. The method of claim 1, further comprising, adding an additional neutronically translucent liquid carrier material to the solution to reduce concentration of the fissile nuclear fission fuel material in the solution.

9. The method of claim 1, wherein disposing the undissolved fertile nuclear fission fuel material includes forming an annulus in the undissolved fertile nuclear fission fuel material such that natural circulation of the solution is established through a heat exchanger and the annulus.

* * * * *